United States Patent
Troia et al.

(10) Patent No.: US 12,166,899 B2
(45) Date of Patent: *Dec. 10, 2024

(54) SECURE DEVICE COMMUNICATION

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 527 days.

This patent is subject to a terminal disclaimer.

(21) Appl. No.: 17/479,550

(22) Filed: Sep. 20, 2021

(65) Prior Publication Data

US 2022/0006650 A1  Jan. 6, 2022

Related U.S. Application Data

(63) Continuation of application No. 16/362,772, filed on Mar. 25, 2019, now Pat. No. 11,128,474.

(51) Int. Cl.
H04L 29/06 (2006.01)
H04L 9/32 (2006.01)
(Continued)

(52) U.S. Cl.
CPC .......... *H04L 9/3247* (2013.01); *H04L 9/3268* (2013.01); *H04L 9/3297* (2013.01);
(Continued)

(58) Field of Classification Search
CPC ... H04L 9/3247; H04L 9/3268; H04L 9/3297; H04L 63/0492; H04L 63/068;
(Continued)

(56) References Cited

U.S. PATENT DOCUMENTS 7,545,766 B1 * 6/2009 Muhanna ............. H04W 60/00
                                                    370/338
9,215,223 B2 * 12/2015 Kirsch ................... G06F 21/31
(Continued)

FOREIGN PATENT DOCUMENTS

CA    2920661 C  *  5/2019  ........... G06Q 20/322
CN  109492352 A  *  3/2019  ........... G06F 21/125
(Continued)

OTHER PUBLICATIONS

Microsoft, DICE: Device Identifier Composition, Jan. 2015, Internet, pp. 1-2. (Year: 2015).*
(Continued)

*Primary Examiner* — Sher A Khan
(74) *Attorney, Agent, or Firm* — Brooks, Cameron & Huebsch, PLLC

(57) ABSTRACT

The present disclosure includes secure device communication. An embodiment includes a processing resource, a memory, and a network management device communication component configured to, send public information to a network attached device communication component, and receive a network attached device public key and an encrypted random string value from the network attached device communication component. The network attached device public key and the random string value are received independent of a type of the network attached device communication component due to the public information. The network management communication component is further configured to decrypt the random string value from the network attached device communication component and send, to the network attached device communication component, a message and a signature to authenticate independent of the type of the network attached device communication component due to the public information.

20 Claims, 16 Drawing Sheets

(51) Int. Cl.
*H04L 9/40* (2022.01)
*G06F 7/58* (2006.01)

(52) U.S. Cl.
CPC ........ *H04L 63/0492* (2013.01); *H04L 63/068* (2013.01); *G06F 7/588* (2013.01)

(58) Field of Classification Search
CPC ... H04L 9/088; H04L 9/3263; H04L 63/0442; H04L 63/123; H04L 9/0861; H04L 41/28; H04L 63/08; G06F 7/588
See application file for complete search history.

(56) References Cited

U.S. PATENT DOCUMENTS

| | | | |
|---|---|---|---|
| 9,467,437 B2 * | 10/2016 | Krishnaprasad | G06F 16/2228 |
| 10,218,705 B2 * | 2/2019 | Wilson | H04W 12/06 |
| 10,320,569 B1 | 6/2019 | Wentz et al. | |
| 10,841,102 B2 * | 11/2020 | Nitschke | H04L 9/3297 |
| 11,265,361 B2 * | 3/2022 | Choi | H04L 67/63 |
| 2008/0016332 A1 * | 1/2008 | Holden | H04L 63/126 |
| | | | 713/166 |
| 2014/0025944 A1 * | 1/2014 | Maletsky | G06F 21/57 |
| | | | 713/150 |
| 2015/0310067 A1 * | 10/2015 | Svoboda | G06F 21/6218 |
| | | | 707/781 |
| 2015/0339664 A1 * | 11/2015 | Wong | H04L 63/0823 |
| | | | 705/71 |
| 2016/0119166 A1 * | 4/2016 | Shin | H04L 41/08 |
| | | | 709/203 |
| 2016/0248590 A1 * | 8/2016 | Benson | H04W 12/12 |
| 2017/0302640 A1 | 10/2017 | Maletsky et al. | |
| 2017/0344407 A1 * | 11/2017 | Jeon | G06F 21/74 |
| 2019/0042779 A1 * | 2/2019 | Agerstam | G06F 21/554 |
| 2019/0089717 A1 * | 3/2019 | Dolev | H04L 9/0866 |
| 2019/0140919 A1 * | 5/2019 | Smith | H04L 67/51 |
| 2019/0207917 A1 * | 7/2019 | Tasher | G06F 21/64 |
| 2019/0222424 A1 | 7/2019 | Lindemann | |
| 2019/0363888 A1 * | 11/2019 | Brostrom | H04L 9/3234 |
| 2020/0119929 A1 * | 4/2020 | Edwards | H04L 9/3265 |
| 2020/0128067 A1 * | 4/2020 | Guim Bernat | H04L 41/5009 |
| 2020/0193065 A1 * | 6/2020 | Smith | G06F 21/73 |
| 2020/0213306 A1 * | 7/2020 | Thomsen | H04L 9/0637 |

FOREIGN PATENT DOCUMENTS

| | | | | |
|---|---|---|---|---|
| CN | 109714735 A | * | 5/2019 | ........... H04L 27/261 |
| CN | 111367834 A | * | 7/2020 | ......... G06F 12/1408 |
| JP | 2023004857 A | * | 1/2023 | ......... H04L 43/0876 |
| WO | WO-2018076798 A1 | * | 5/2018 | ............. H04L 29/06 |
| WO | WO-2019161285 A1 | * | 8/2019 | |
| WO | WO-2020073206 A1 | * | 4/2020 | ............. G06F 21/57 |

OTHER PUBLICATIONS

U.S. Appl. No. 15/853,498, entitled, "Physical Unclonable Function Using Message Authentication Code", filed Dec. 22, 2017, 28 pages.
U.S. Appl. No. 16/201,652, entitled, "Parking Infrastructure Powered by a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.

* cited by examiner

US 12,166,899 B2

SECURE DEVICE COMMUNICATION

PRIORITY INFORMATION

This application is a Continuation of U.S. application Ser. No. 16/362,772, filed on Mar. 25, 2019, which will issue as U.S. Pat. No. 11,128,474 on Sep. 21, 2021, the contents of which are incorporated herein by reference.

TECHNICAL FIELD

The present disclosure relates generally to network management devices, and more particularly, to secure communication between a network management device and a network attached device.

BACKGROUND

Wireless mechanisms have been employed in a variety of products, including, for example, locking mechanisms (e.g., unlocking a car door, starting the engine, unlocking a house door, etc.). In such products, a paring between a network management device (e.g., a signaler such as a wireless key-fob) and the network attached device (e.g., the locking mechanism of the car or house) can be used to add security to the process.

Threats from hackers or other malicious users, however, can affect the security of the communication between the network management device and the network attached device. Such threats can include man-in-the-middle (MITM) attacks, among others, and can cause significant financial loss and/or present significant safety and/or security issues. For instance, a hacker or other malicious user can use an MITM attack to gain unauthorized access to (e.g., break into and/or steal) or otherwise improperly manipulate a network attached device.

DETAILED DESCRIPTION

Figure 1:
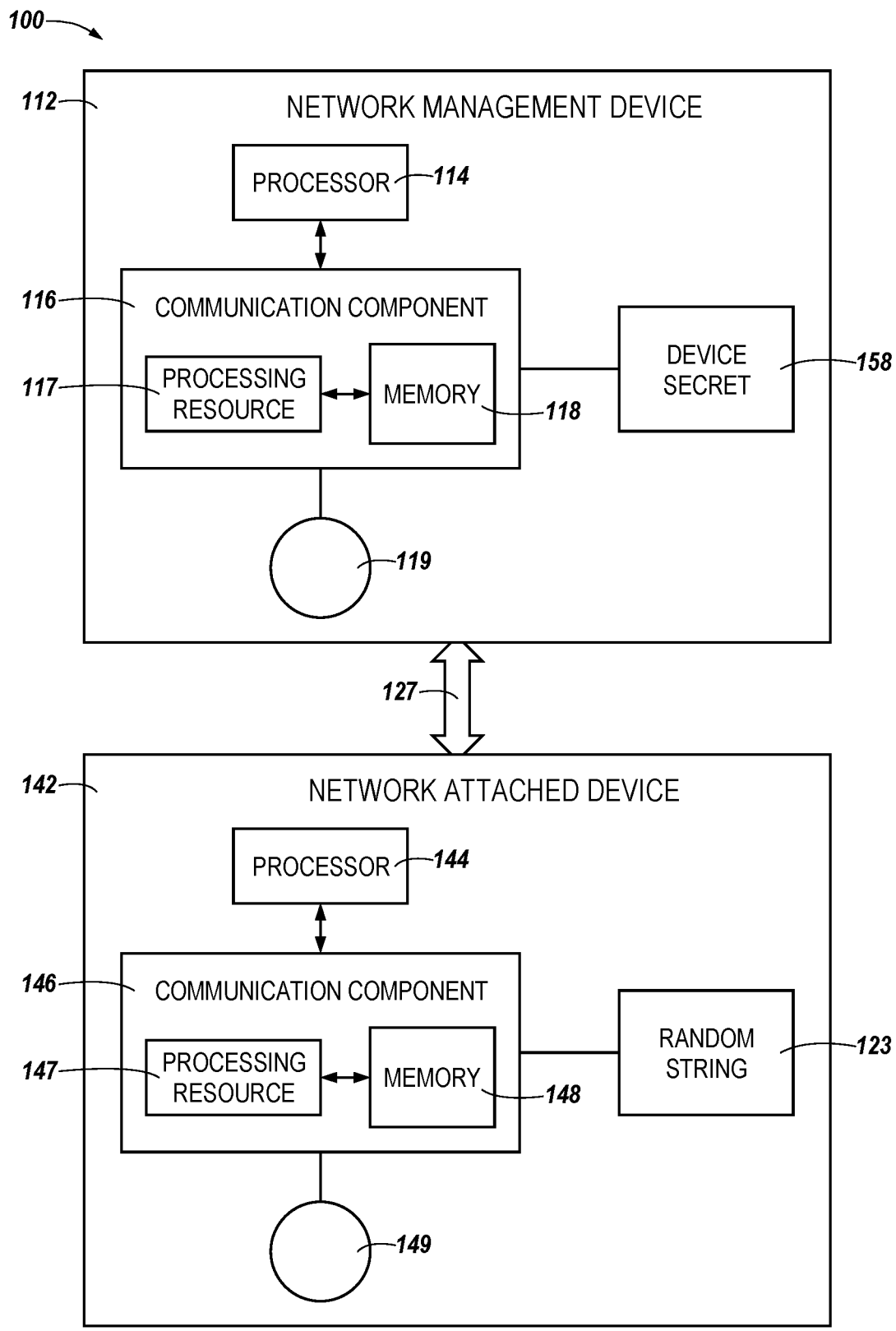
FIG. 1 is a block diagram of a system for secure device communication in accordance with an embodiment of the present disclosure.

The present disclosure includes apparatuses, methods, and systems for secure communication between devices, e.g., between a network management device and a network attached device. An embodiment includes a processing resource, memory, and network management device communication component configured to, generate public information of a network management device and a multi-device private key, and send the public information of network management device to the network attached device. The network management device communication component is further configured to receive, from the network attached device, a network attached device public key and an encrypted random string value of information, e.g., of bits representing a random value, configured to decrypt the random string value using the network attached device public key, and send the decrypted random string value, a command, and a network management device signature to the network attached device.

Many threats from hackers or other malicious users can affect the security of communication between a network management device (e.g. a network management device running on a server or another computing device, such as, for instance, a control panel with home/building software, and/or another type of computing device which includes software/hardware that may communicate with devices within an environment) and a network attached device (e.g. a vehicle security device, a home security device, etc.). For example, a hacker or other malicious user may attempt to perform activities, such as, for instance, a man-in-the-middle (MITM) attack, to monitor, interfere with, and/or intercept wireless communications between the network management device and the network attached device for malicious purposes. One example of an MITM attack is a replay attack, in which a transmission may be recorded (e.g., using a radio receiver in proximity to the signaler) and then replayed in the future to achieve an unauthorized action. Such hacking activities can cause significant financial loss and/or present significant safety and/or security issues. For instance, a hacker or other malicious user can use an MITM attack to gain unauthorized access to (e.g., break into and/or steal from) a building or vehicle.

Secure device coupling can ensure the secure access to network attached devices. Network attached devices can use network attached device public keys to securely couple to network management devices. After the initial coupling, the network management devices and network attached devices can use public and private keys to securely encrypt and exchange data such that only the network management devices and the network attached devices can decrypt and read the data.

It is important to ensure that data exchanged between a network management device and a network attached device are secure in order to prevent unauthorized access to the data. Previous mechanisms used to exchange data between network attached devices and network management devices have included using a wireless network to exchange data between the network attached device and the network management device. This approach may cause security concerns where a malicious device can transmit operation instructions to network attached devices causing security and safety concerns.

To address security concerns presented by such unauthorized access of data, NFC (or other short-range wireless communication such as RFID, etc.) may be used to exchange public keys, certificates, and a random string value. Private keys are used to encrypt any further communications.

Further, embodiments of the present disclosure can utilize a device identification composition engine-robust internet of things (DICE-RIoT) protocol to further achieve a secure communication between the network management device and the network attached device by guaranteeing, for instance, the mutual decryption of the network management device and the network attached device, the correctness of the message being communicated, the attestation of data stored in the network management device and network attached device, and/or a back-up (e.g., rescue) procedure for unlocking the network attached device using a remediation block. Such a DICE-RIoT protocol can be implemented using the existing circuitry (e.g., the existing hardware and/or firmware) of the network management device and the network attached device, without having to add additional (e.g., new) components or circuitry dedicated specifically to the secure communication functionality. As such, embodiments of the present disclosure can achieve a secure communication between the network management device and network attached device without increasing the size, complexity, and/or cost of the network attached device and/or network management device circuitry, and can be compatible with any network management device or network attached device that implements such a DICE-RIoT protocol.

As used herein, "a", "an", or "a number of" can refer to one or more of something, and "a plurality of" can refer to two or more such things. For example, a memory device can refer to one or more memory devices, and a plurality of memory devices can refer to two or more memory devices.

The figures herein follow a numbering convention in which the first digit or digits correspond to the drawing figure number and the remaining digits identify an element or component in the drawing. Similar elements or components between different figures may be identified by the use of similar digits.

FIG. 1 is a block diagram of a system 100 for secure device communication in accordance with an embodiment of the present disclosure. For instance, as shown in FIG. 1, system 100 can include a network management device 112, and a network attached device 142. Network management device 112 and network attached device 142 can communicate wirelessly with each other via wireless link 127, as illustrated in FIG. 1.

As shown in FIG. 1, a network management device 112 can include a processor 114 coupled to a network management device communication component 116, such as a reader, writer, transceiver, and/or other computing device or circuitry capable of performing the functions described below, that is coupled to (e.g., or includes) an antenna 119. Network management device communication component 116 can include a processing resource 117 coupled to a memory 118, such as a non-volatile flash memory, although embodiments are not so limited. Memory 118 can include instructions executable by processing resources 114 and/or 117.

Antenna 119 of network management device 112 can be in communication with (e.g., communicatively coupled to) antenna 149 of network attached device 142 via wireless link 127. In an example, network management device 112 and/or network attached device 142 can include a number of wireless communication devices, such as transmitters, transponders, transceivers, or the like. As an example, the network management device communication component 116 and/or network attached device communication component 146 can be such a wireless communication device. Wireless communication can be a short-range communication. The short-range communication used can include near field communication (NFC) tags, RFID tags, Bluetooth, Bluetooth Low Energy, EnOcean, wireless connection technology (e.g., Wi-Fi), Wi-SUN Field Area Networks, and/or a cable connection between the network attached device 142 and the network management device 112. In an embodiment, wireless communication can be performed using non-volatile storage components that can be respectively integrated into chips, such as microchips. Each of the respective chips can be coupled to a respective antenna 119 and 149.

As shown in FIG. 1, network attached device 142 can include a processing resource (e.g., processor) 144 coupled to a network management device communication component 116, such as a reader, writer, transceiver, and/or other computing device or circuitry capable of performing the functions described below, that is coupled to (e.g., or includes) an antenna 149. Network attached device communication component 146 can include a processing resource 147 coupled to a memory 148, such as a non-volatile flash memory, although embodiments are not so limited. Memory 148 can include instructions executable by processing resources 144 and/or 147. In an embodiment, network attached device communication component 146 and/or processor 144 can be part of an on-board computer of the network attached device 142.

Network attached device 142 can be an Internet of Things (IoT) enabled device, such as, for instance, a vehicle, a house, or other types of IoT devices that include, among other things, a lock (e.g., a locking mechanism, such as actuator). Network management device 112 can be a signaler for the network attached device 142, such as, for instance, a key-fob, that can be used to lock and unlock the lock (e.g., door lock(s)) of network attached device 142, start the engine of network attached device 142, and/or turn the lights on of network attached device 142, as will be further described herein. Although the examples described herein involve a vehicle, other systems, such as a garage door and garage door opener, etc. could be used with the devices and techniques described herein.

Network management device 112 and network attached device 142 can communicate securely with each other via wireless link 127. For example, network management device communication component 116 can provide (e.g., transmit), via wireless link 127, a command to network attached device communication component 146 to switch the state of a lock of the network attached device 142 from a first state to a second state. For instance, the command may be to switch the state of the lock from locked to unlocked (e.g., to unlock the door(s) of network attached device 142 remotely). In an embodiment, the command may also include and/or be a command to switch the state of the engine of network attached device 142 from a first state to a second state. For instance, the command may be to switch the state of the engine from off to on (e.g., to start the engine of network attached device 142 remotely).

The network management device 112 may include a device secret 158. The device secret 158 for the network management device 112 may be provisioned onto the network management device 112 during the manufacturer of the network management device 112. The communication between the network management device 112 and its device secret 158 is described in connection with FIGS. 5-6. The network attached device 142 can generate a public key, a private key, and an encrypted random string value. The network management device 112 and the network attached device 142 can exchange public information to couple to each other via short-range communication. The public information from the network management device 112 can include the public key, public certificate, and a public identification. The network management device 112 and the network attached device 146 can exchange public keys to couple to each other. The network attached device 142 can generate the network attached device public key and private key in response to receiving public information from a network management device 112. The public information can be comprised of a network management device public key, a network management device public identification, and a network management device certificate from the network management device 112. The device secret 158 of the network management device 112 may allow the network management device 112 to generate a public key, a network management device public ID, and a network management device certificate (e.g., the public information). Network management device communication component 116 can generate the network management device public key and private key using the device secret 158 for network management device 112 that is stored in memory 118.

The network management device 112 can be used to control the operation of multiple network attached devices (e.g., network attached device 142). The network management device 112 can couple to multiple network attached devices by using the device secret 158 and the public information as described above. The device secret 158 of the network management device communication component 116 can be used to couple to multiple network attached device communication components 146. The device secret 158 of the network management device communication component 116 can couple to different types of network attached devices, such as vehicles, houses, safes, etc. After coupling to the network attached device communication component 146, the network management device communication component 116 can send a command to the network attached device communication component 146. In response to receiving that command, and recognizing the public information of the network management device 112 stored in the layers of the DICE-RIoT protocol, the network attached device communication component 146 can send an encrypted random string value to the network management device communication component 116 to verify the identity of the network management device communication component 116.

The network management device communication component 116 can use the public key received from the network attached device communication component 146 to decrypt the random string value 123. Once the random string value 123 is decrypted, a message and a signature is sent to the network attached device communication component 146. The message is comprised of the decrypted random string value 123 and a command. After receiving the message and the signature, the network attached device 142 can perform the command.

The command performed by the network attached device 142 may be a lock and/or unlock operation. For example, the network attached device 142 can command a door of a vehicle, a house, a safe, etc. to lock and/or unlock. The network attached device can also perform other commands such as starting a vehicle and turning the lights in a house on and/or off, opening/closing a garage door, etc.

Freshness can be attached to (e.g., included with) the random string value 123 when the network attached device communication component 146 sends the random string value 123 to the network management device communication component 116. Freshness is an anti-replay value that adds security to the exchange of data. An example of freshness may include a time stamp. Adding freshness to the random string value 123 may not allow the random string value 123 to be used to facilitate an exchange of data more than one time. The random string value 123 can be text which can include groups of integers and/or characters. The random string value 123 can be generated from a random number generator, and/or another component used to generate random string values of text included on the network attached device communication component 146

The network attached device communication component 146 can generate a timestamp using, for example, a clock present on board a vehicle, such as, for instance, a GPS signal, and provide the timestamp to network management device communication component 116, as will be further described herein, and the timestamp used by network management device communication component 116 can be the last timestamp received from network attached device communication component 146. An example of the generation of the network management device 112 and network attached device 142 public identifications and certificates will be further described herein in connection with FIGS. 5-9.

Further, the network management device communication component 116 can generate a digital signature for network management device communication component 116, and network attached communication component 146 can generate a digital signature for network attached device communication component 146. The digital signature for network management device communication component 116 can be generated using the network management device private key, and the digital signature for network attached communication component 146 can be generated using the network attached device private key. An example of the generation of the digital signatures will be further described in FIG. 9 herein.

The network attached device public key, the network attached device public identification, network attached device certificate, anti-replay value (e.g., a timestamp), and the digital signature generated by network attached device communication component 146 for each respective verification, can be provided (e.g., transmitted), via wireless link 127, to the network management device communication component 116.

The network attached device communication component 146 can verify (e.g., attempt to verify) the identity of network management device communication component 116. The network attached device communication component 146 can verify the identity of network management device communication component 116, for instance, using the digital signature for the network management device communication component 116, which in turn can be verified using the network attached device public key that was generated by the network attached device communication component 146.

If the network attached device communication component 146 is unable to verify the identity of the network management device communication component 116, this may indicate that a failure condition has occurred, and that the command received by the network attached device communication component 146 may not be authentic (e.g., may not have originated from the network management device communication component 116). As such, in response to such a failure condition, the network attached device communication component 146 and the network management device communication component 116 may cease to perform any further verification, and the command may not be completed.

In an embodiment, the network attached device communication component 146 may receive a request from the network management device communication component of an additional (e.g., new) network management device to pair (e.g., couple) the additional network management device with the network attached device 142. The request may be received, for instance, when the additional network management device is in close proximity to the network attached device 142, via a short-range communication method such as, for instance, NFC, RFID, and/or Bluetooth, among others. The network attached device communication component 146 can store the public information of each network management device that it has coupled to. This can allow each network management device that has coupled to the network attached device 142 to communicate with the network attached device 142. Each network management device coupled to the network attached device 142 can have the same certificate.

In such an embodiment, network attached device communication component 146 can, in response to receiving the request, generate a network attached device public key, a network attached device public identification, and a network attached device certificate. The network attached device communication component 146 can then provide (e.g., transmit), via the short-range communication method, the network attached device public key, network attached device public identification, and network attached device certificate, to the network management device communication component of the additional network management device.

Upon receiving the network attached device public key, network attached device public identification, and network attached device certificate, the network management device communication component of the additional network management device can generate a network management device public key, a network management device public identification, and a network management device certificate, in a manner analogous to that previously described herein (e.g., the network management device public key can be generated using a device secret for the additional network management device). The network management device communication component of the additional network management device can then provide, via the short-range communication method, the network management device public key, network management device public identification, and network management device certificate, to the network attached device communication component 146.

The network attached communication component 146 can verify (e.g., attempt to verify) the identity of the network management device communication component of the additional network management device using the network management device public key, network management device public identification, and network management device certificate, and pair with the network management device communication component of the additional network communication device in response to verifying its identity. Once paired, network attached device communication component 146 can receive a command from the additional network management device to switch the state of the lock of network attached device 142.

Figure 2:
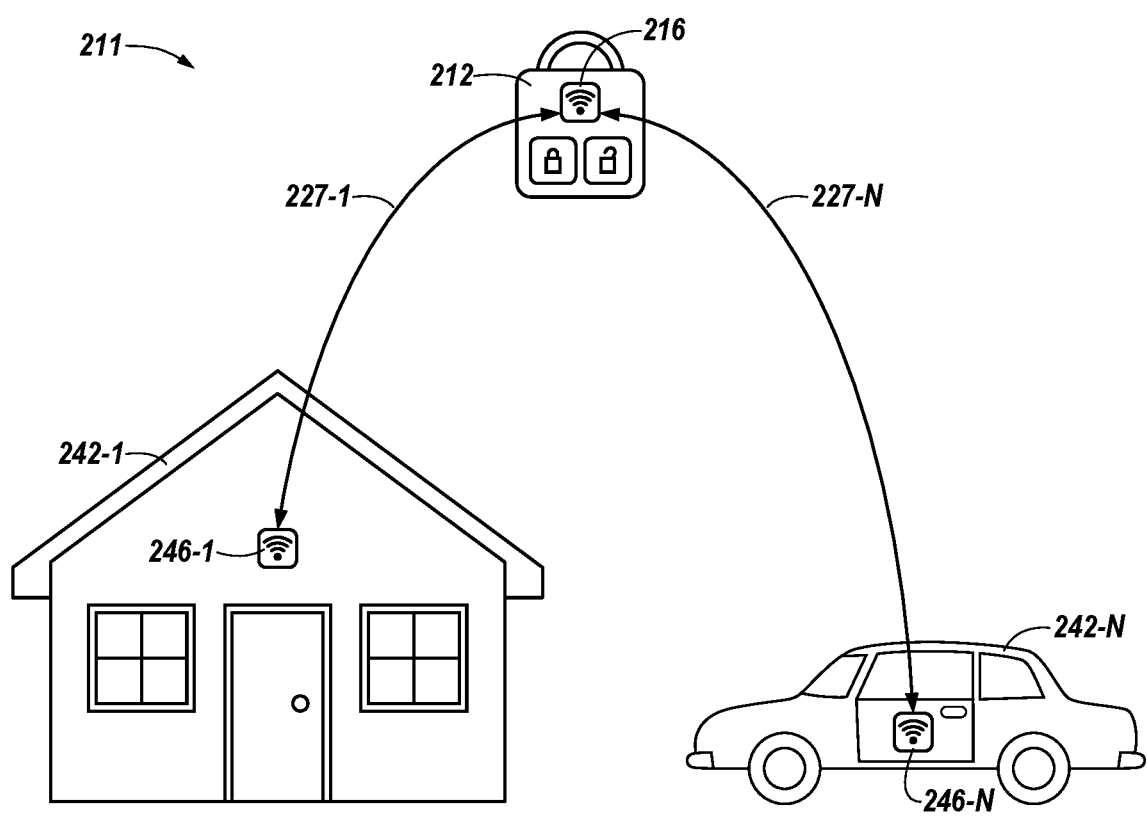
FIG. 2 is an illustration of an environment for secure device communication in accordance with an embodiment of the present disclosure.

FIG. 2 is an illustration of an environment 211 for secure device communication in accordance with an embodiment of the present disclosure. Network management device 212 and the network attached devices 242-1 and 242-N (collectively referred to as network attached devices 242) can be, for instance, network management device 112 and network attached device 142, respectively, previously described in connection with FIG. 1. Each network attached device 242 can include a network attached device processing resource (e.g., the processing resource 147) coupled to a network attached device communication component 246-1 and 246-N (collectively referred to as network attached device communication component 246). Data may be transmitted using wireless links 227-1 and 227-N (collectively referred to as wireless links 227). Secure device coupling can be executed between the network management device 212 and the network attached devices 242 as previously described in connection with FIG. 1.

An environment 211 may include a wireless network such as a Local Area Network (LAN) or a Wide Area Network (WAN) to transmit commands to the network attached devices 242. The commands can be transmitted after the network management device 212 is securely coupled to the network attached devices 242 via a short-range communication device (e.g., NFC, RFID, etc.).

The network management device 212 can include NFC (or another wireless communication component e.g., RFID, etc.). The network management device 212 can execute instructions via a processor (e.g., the processor 114). An instruction can, for example, be a command to open a door. In some embodiments, the network management device 212 may be a network management device running on a server or another computing device, such as, for instance, a control panel with home/building software, and/or another type of computing device which includes software/hardware that may communicate with devices within an environment and a network attached device 242 may be a vehicle security device, a home security device, etc. The vehicle security device and home security device may have a network attached device communication component 246 that can couple to the network management device communication component 216 by exchanging public keys.

The network management device 212 may send a command to the network attached device communication component 246 to, for example, start the engine of a vehicle or open the door to a garage. Once the command is received, the network attached device communication component 246 can send an encrypted random string value to the network management device communication component 216. The random string value can be decrypted by the network management device communication component 246. Once the random string value is decrypted, it is sent back to the network attached device communication component 246 along with a command and a signature of the network management device communication component 216. The signature and the decrypted random string value can be verified by the network attached device communication component 246. Once the verification is complete, the network attached device communication component 246 may perform the command.

In some embodiments, a network attached device 242 may refrain from coupling to the network management device 212. For example, a network management device may not have an authentic network management public key, network management public ID, and/or network management certificate. If the aforementioned public information is not authentic then the network attached device communication component 242 may not couple to the network management device communication component 216.

Using the method for secure device communication described in connection with FIGS. 1 and 2, the network management device 212 can control the operation of multiple network attached devices 246. In this way, the network management device 212 can include both the public key for the network attached device 242-1 and the public key 242-N to securely manage the operations of network attached devices 242-1, and 242-N.

In some embodiments, a network attached device 242 may refrain from executing a command received from the network management device communication device 216. In response to receiving a command from the network management device communication component 216, a network attached device communication component 246 may send an encrypted random string value with freshness. If the random string value is not decrypted and sent to the network attached device communication component 246, the network attached device communication component 246 may refrain from executing the command.

The freshness can be an anti-replay value. If the anti-replay value includes a timestamp, the verification of the anti-replay value can include determining whether the current timestamp transmitted from the network management device 212 matches the previous timestamp transmitted from the network management device 212 to the network attached device 242. The network attached device 242 can determine whether the difference between the current timestamp of the network management device 212 and the previous timestamp is less than a threshold amount of time, such as, for instance, 10 or 20 milliseconds. If the anti-replay value and/or the digital signature are unable to be successfully verified, or if the timestamp difference is not less than the threshold, the command may not be authentic, and the network attached device 242 can refrain from performing the command. If the anti-replay value and digital signature are successfully verified, and the timestamp difference is less than the threshold, the network attached device can perform the command.

Figure 3:
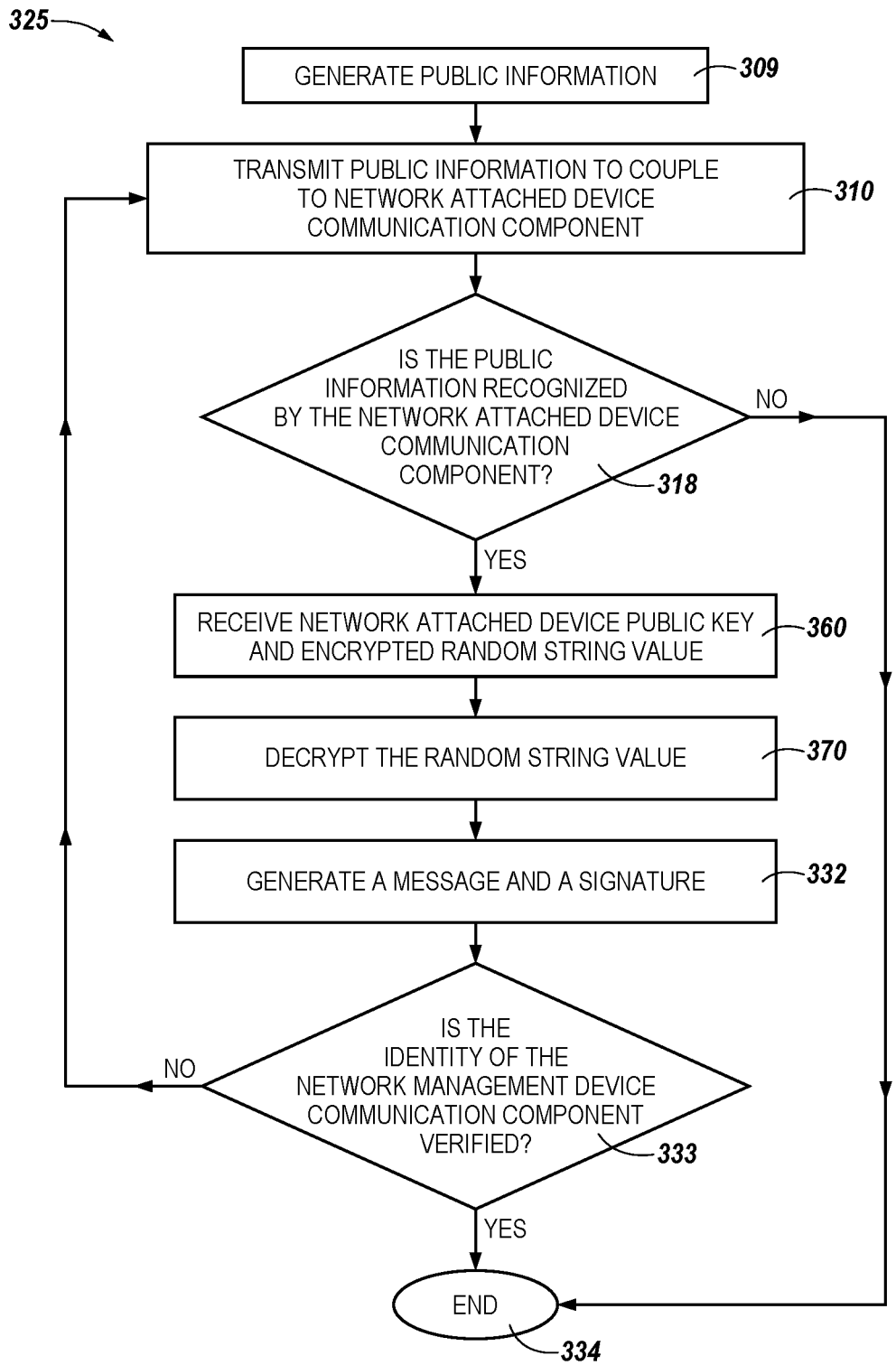
FIG. 3 illustrates a method for secure device communication in accordance with an embodiment of the present disclosure.

FIG. 3 illustrates a method 325 for secure device communication in accordance with an embodiment of the present disclosure. The network management device and the network attached device can be, for instance, network management device 112 and network attached device 142, respectively, previously described in connection with FIG. 1. Method 325 can be performed by network management device 112 (e.g. network management device communication component 116) as previously described in connection with FIG. 1.

At block 309, method 325 includes generating public information. The public information can be comprised of a network management device public key, a network management device public identification, and a network management device certificate. Further, although not shown in FIG. 3, a network management device private key can also be generated, as previously described herein. The generation of the network management device public key, network management device public identification, and network management device certificate will be further described herein (e.g., in connection with FIG. 6).

At block 310, method 325 includes transmitting the network management device public information to the network attached device. The network management device public information can be used to couple to multiple network attached devices.

At block 318, method 325 includes verifying (e.g. attempting to verify) the network management device public information sent to the network attached device. For instance, block 318 can include verifying the network management device public information. The verification of the network management device public information can be performed using a DICE-RIoT protocol and will be further described in connection with FIG. 8. If the network management device public information is unable to be successfully verified, method 306 ends at block 334. If the network management device public information is successfully verified, method 325 proceeds to block 360.

At block 360, method 325 includes receiving a network attached device public key and an encrypted random string value. Freshness is attached to the random string value to add extra security to the exchange of data. The random string value is used to verify that the network management device sending the command is an authentic network management device. An example of freshness is a time stamp as described in FIGS. 1 and 2.

At block 370, method 306 includes decrypting the random string value. The network attached device public key, which may have been received earlier by the network management device, may be used to decrypt the random string value.

At block 332, method 325 includes generating a message and a signature. The message and the signature are generated by the network management device. The message is composed of the decrypted random string value and a command. The network management device private key may be used to sign the message. The message and the signature are both sent to the network attached device.

At block 333, method 325 includes verifying the identity of the network management device. The network management device may need the network attached device public key to decrypt the random string value. The decrypted random string value and the network management device signature may be used by the network attached device to verify the identity of the network management device. If the identity of the network management device is unable to be verified, method 325 returns to block 310. If the identity of the network management device is verified, method 325 ends at block 334.

Figure 4:
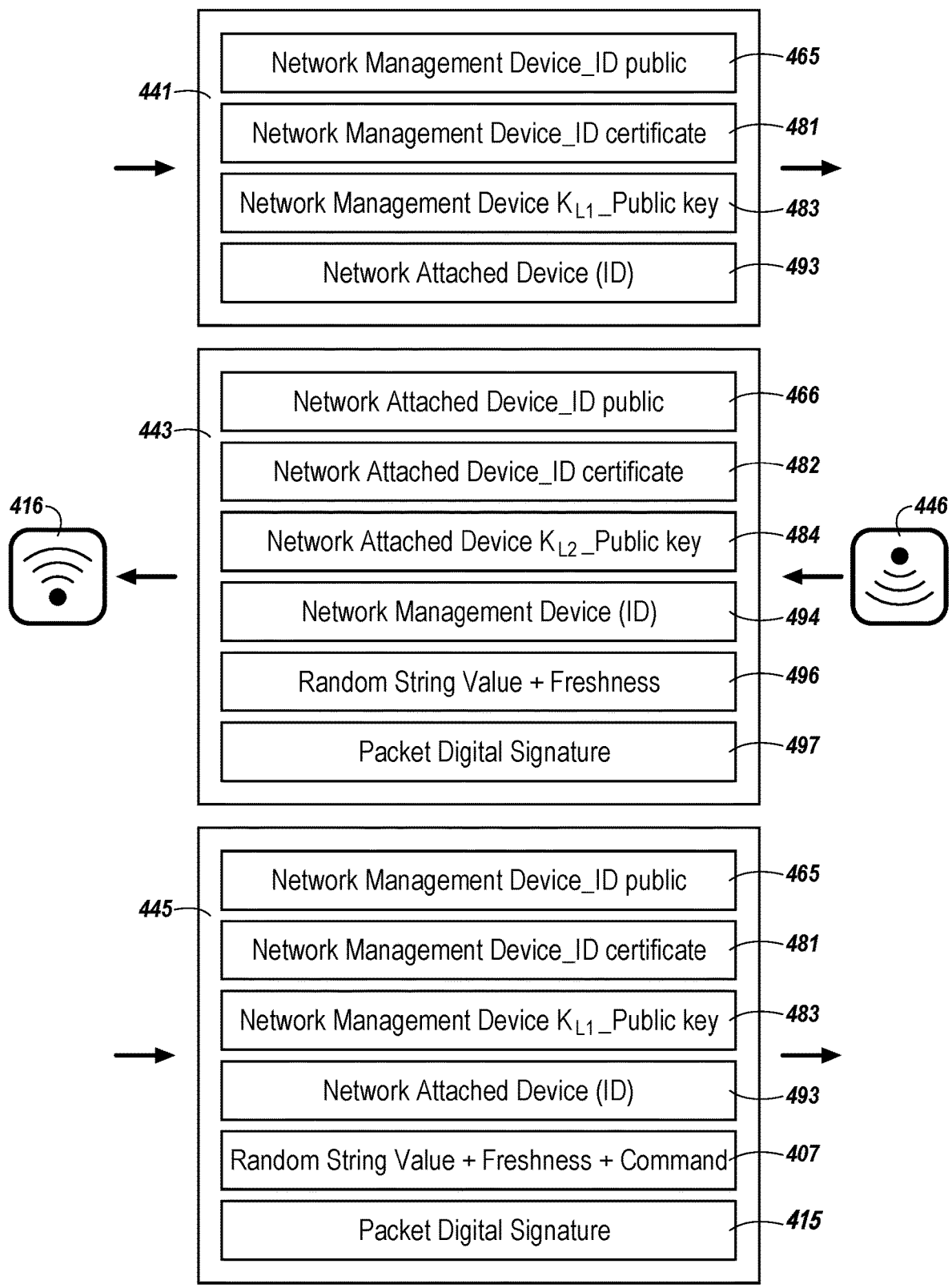
FIG. 4 is an illustration of secure device communication in accordance with an embodiment of the present disclosure.

FIG. 4 is an illustration of secure device communication in accordance with an embodiment of the present disclosure. The network management device communication component 416 and network attached communication component 446 can be, for instance, network management device communication component 116 and network attached device communication component 146, respectively, previously described in connection with FIG. 1.

Authentication data (e.g., packets) 441, 443, and 445 can be exchanged between network management device communication component 416 and network attached device communication component 446 during the performance of a verification process previously described in connection with FIG. 1. For instance, authentication packets 441, 443, and 445 can be used to continue the verification process, with packet 441 transmitted from the network management communication component 416 to network attached device communication component 446, and packet 443 transmitted from the network attached device communication component 446 to network management device communication component 416. Further, packet 445 may be transmitted from the network management device communication component 416 to the network attached communication component 446.

For example, as shown in FIG. 4, authentication data 441 transmitted by the network management device communication component 416 to the network attached device communication component 446 can include a network management device public identification (Network management device_ID public) 465, a network management device certificate (Network management device_ID certificate) 481, a network management device public key (Network management device $K_{L1}$_Public key) 483, and a destination ID. In an embodiment, one or more fields 465, 481, 483, and 493 can be encrypted to further increase the security of the communications. Authentication data 441 can be received by the network attached device communication component 446 independent of the type of network attached device communication component 446 due to the network management device public information. For example, the network attached device communication component 446 can be short-range communication used can include near field communication (NFC) tags, RFID tags, Bluetooth, Bluetooth Low Energy, EnOcean, wireless connection technology (e.g., Wi-Fi), Wi-SUNField Area Networks, and/or a cable connection between the network attached device 142 and the network management device 112.

The network management device public identification 465 can be used to determine the identity of network management device communication component 416, and the network management device certificate 481 can be used to verify that the identity of the network management device communication component 416 is authenticated. The network management device public key 483 can be used to encrypt data to be sent to the network management device communication component 416 in order for the network management device communication component 416 to decrypt the received data using its own private key, as will be described further herein. The destination ID 493 can be used to identify which network attached device communication component 446 is intended to receive a command from the network management device communication component 416. The destination ID 493 can be a form of identification given to the network attached device by the manufacturer, such as a serial number. However, the destination ID can be viewed by a user as an identity of the network attached device that can be changed by the user, such as a nickname for the network attached device.

As shown in FIG. 4, authentication data 443 transmitted by network attached device communication component 446 to the network management device communication component 416 can include a network attached device public identification (Network attached device_ID public) 466, a network attached device certificate (Network attached device_ID certificate) 482, a network attached device public key (Network attached device $K_{L2}$_Public key) 484, a network management device destination ID 494, a random string value with an attached freshness 496, and a packet digital signature 497. In an embodiment, one or more fields 466, 482, 484, 494, 496, and 497 can be encrypted to further increase the security of the communications.

Authentication data 443 can be received by the network management device communication component 416 independent of the type of network attached device communication component 446 due to the network management device public information. For example, the network management device communication component 416 can receive authentication data from network attached devices of various types (e.g., a vehicle, a home appliance, a security device for a building, etc.) The network attached device communication component 446 can be short-range communication (e.g., NFC, etc.).

The network attached device public identification 466 can be used to determine the identity of network attached device communication component 446, and the network attached device certificate 482 can be used to verify that the identity of the network attached device communication component 446 is authenticated. The network attached device public key 484 can be used to encrypt data to be sent to the network attached device communication component 446 in order for the network attached communication component 446 to decrypt the received data using its own private key, as will be described further herein.

The network management device ID 494 can be used to identify the network management device communication component 416 that is intended to receive data from the network attached device communication component 446. The random string value and attached freshness 496 can be used to add security to the exchange of data. The random string value can be a string of random digits used to authenticate the identification of the network management device communication component 416. The freshness can be anti-replay value, such as a timestamp previously described in connection with FIG. 1.

The packet digital signature 497 can be used to verify that the data is sent from an authorized entity such that data with this verifiable signature is from the sender that network attached device communication component 446 is claiming to be. Packet digital signature 497 can be generated by encrypting the signature using the network attached device private key (which is provided only to the network attached device) and can be decrypted using the publicly provided network attached device public key 484. A further description of the signature verification will be further described herein.

Further, as shown in FIG. 4, authentication data 445 transmitted by the network management device communication component 416 to the network attached device communication component 446 can include a network management device public identification (Network management device_ID public) 465, a network apparatus device certificate (Network management device_ID certificate) 481, a network management device public key (Network management device $K_{L2}$_Public key) 483, a network attached device ID 493, a random string value with attached freshness 407, and a packet digital signature 415. Authentication data 445 can be received by the network attached device communication component 446 independent of the type of network attached device communication component 446 due to the network management device public information. The network attached device communication component 446 can be short-range communication (e.g., NFC, etc.)

The network management device public ID 465, the network management device certificate 481, the network management device public key 483, and the network attached device ID 493 have been described herein in relation to authentication data 441. The combination of a random string value, freshness, and a command 407 is used to command the network attached device to perform an action. The action performed may be an operation (e.g., lock/unlock, open/close, etc.) of the network attached device (e.g., the network attached device 142). The random string value in this combination 407 has been decrypted by the network management device communication component 416. The combination of the random string value, freshness, and command, once received by the network attached device, can be used to verify the identity of the of the network management device and show that the command came from the coupled network management device communication component 416.

Public keys 483 and 484 can be used to encrypt data sent to each respective communication component 416 and 446 and verify the identity of each communication component. As an example, and as will be further described below, network management device communication component 416 can encrypt data using the network attached device public key 484 and send the encrypted data to network attached device communication component 446. Likewise, network attached device communication component 446 can encrypt data using network management device public key 483 and send the encrypted data to network management device communication component 416.

Figure 5:
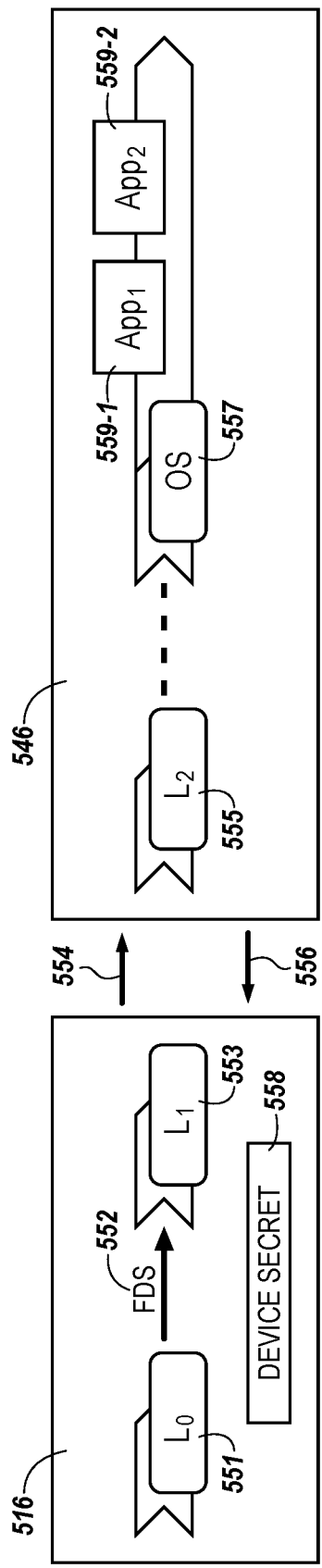
FIG. 5 is a block diagram of an example system including a network management device communication component and a network attached device communication component in accordance with an embodiment of the present disclosure.

FIG. 5 is a block diagram of an example system including a network management device communication component 516 and a network attached device communication component 546 in accordance with an embodiment of the present disclosure. Network management device communication component 516 and network attached device communication component 546 can be, for example, network management device communication component 116 and network attached device communication component 146 previously described in connection with FIG. 1.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the network management communication component 516. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIoT) core protocol) can use the FDS 552 to validate code of Layer 1 553 that it loads. In an example, the particular protocol can include a device identification composition engine (DICE) and/or the RIoT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the network management device communication component 516, such that FDS 552 is unique to network management device communication component 516.

The network management device communication component 516 can transmit data, as illustrated by arrow 554, to the network attached device communication component 546. The transmitted data can include a network management device identification that is public (e.g., 465 in FIG. 4), a certificate (e.g., a network management device identification certificate 481), and/or a network management device public key (e.g., 483). Layer 2 ("$L_2$") 555 of the network attached device communication component 546 can receive the transmitted data and execute the data in operations of the operating system ("OS") 557 and on a first application 559-1 and a second application 559-2.

In an example operation, the network management device communication component 516 can read the device secret 558, hash an identity of Layer 1 553, and perform a calculation including:

$$K_{L1}=KDF[Fs(s),Hash(\text{``immutable information''})]$$

where $K_{L1}$ is a network management device public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$FDS=HMAC\text{-}SHA256[Fs(s),SHA256(\text{``immutable information''})]$$

Likewise, the network attached device communication component 546 can transmit data, as illustrated by arrow 556, including a network attached device identification that is public (e.g., network attached device public identification 466), a certificate (e.g., a network attached device identification certificate 482), and/or a network attached device public key (e.g., public key 484).

Figure 6:
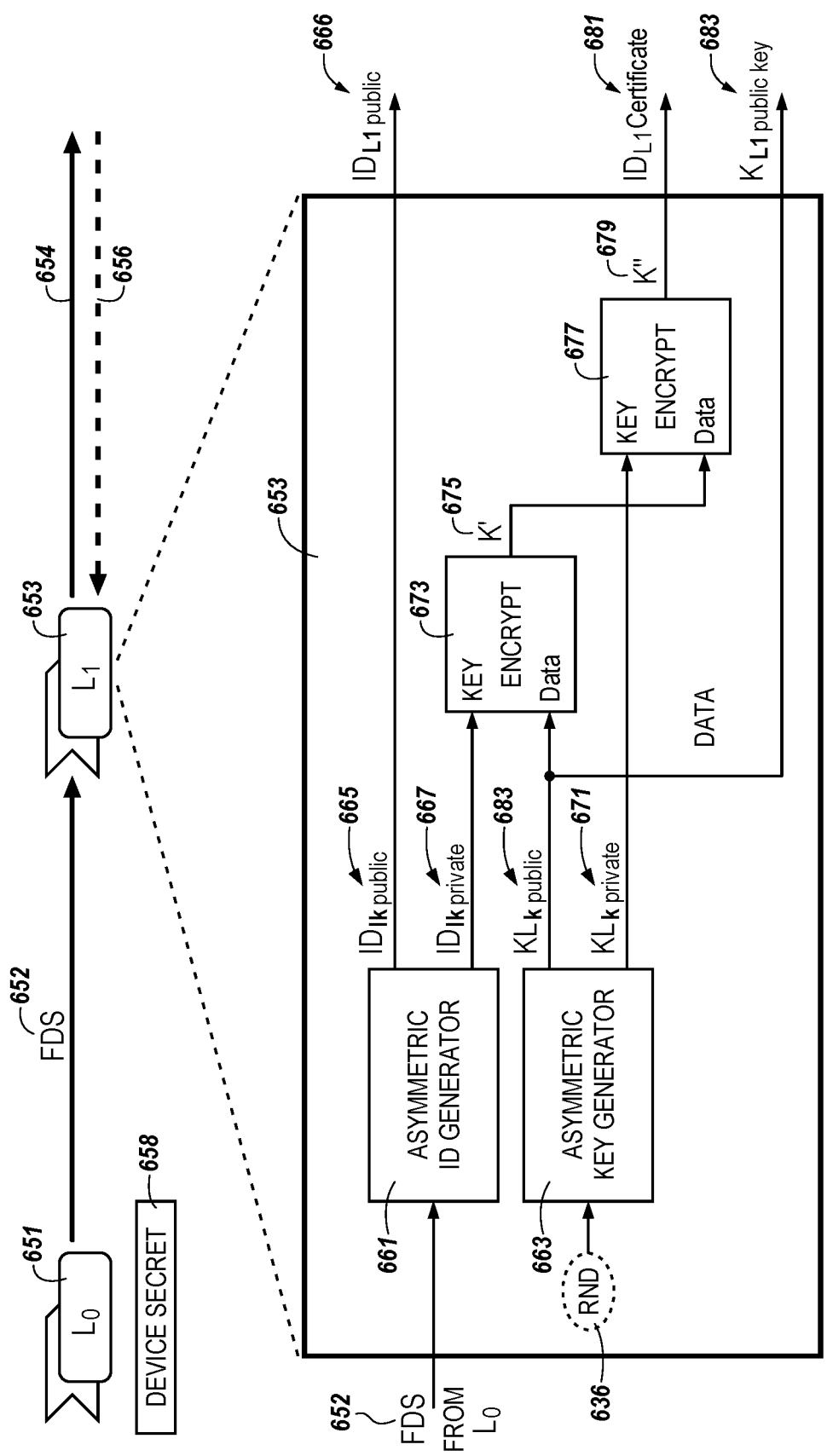
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the network management device public identification, the network management certificate, and the network management device public key that are then sent, indicated by arrow 654, to Layer 2 (e.g., Layer 2 555) of a network attached communication component (e.g., 546 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 665 and a private identification 667. In the abbreviated "$ID_{lk\ public}$," the "lk" indicates Layer k (in this example Layer 1), and the "public" indicates that the identification is openly shared. The public identification ("$ID_{L1public}$") 665 is illustrated as shared by the arrow extending to the right and outside of Layer 1 653 of the external communication component. The generated private identification 667 is used as a key input into an encryptor 673. The encryptor 673 can be any processor, computing device, etc. used to encrypt data.

Layer 1 653 of a network management device communication component can include an asymmetric key generator 663. In at least one example, a random number generator (RND) 636 can optionally input a random number into the asymmetric key generator 663. The asymmetric key generator 663 can generate a public key ("$K_{Lk\ public}$") 683 (referred to as a network management device public key) and a private key ("$K_{LK\ private}$") 671 (referred to as a network management device private key) associated with a network management device communication component such as network communication component 516 in FIG. 5. The network management device public key 683 can be an input (as "data") into the encryptor 673. The encryptor 673 can generate a result K'675 using the inputs of the network management device private identification 667 and the network management device public key 683. The network management device private key 671 and the result K'675 can be input into an additional encryptor 677, resulting in output K" 679. The output K" 679 is the network management device certificate ("$ID_{L1}$ certificate") 681 transmitted to the Layer 2 (555 of FIG. 5). The network management device certificate 681 can provide an ability to verify and/or authenticate an origin of data sent from the network management device communication component. As an example, data sent from the network management device communication component can be associated with an identity of the network management device communication component by verifying the certificate, as will be described further in association with FIG. 8. Further, the network management device public key ("$K_{L1\ public\ key}$") 683 can be transmitted to Layer 2. Therefore, the public identification 665, the certificate 681, and the public key 683 of a Layer 1 653 of a network management device communication component can be transmitted to Layer 2 of a network attached device communication component.

Figure 7:
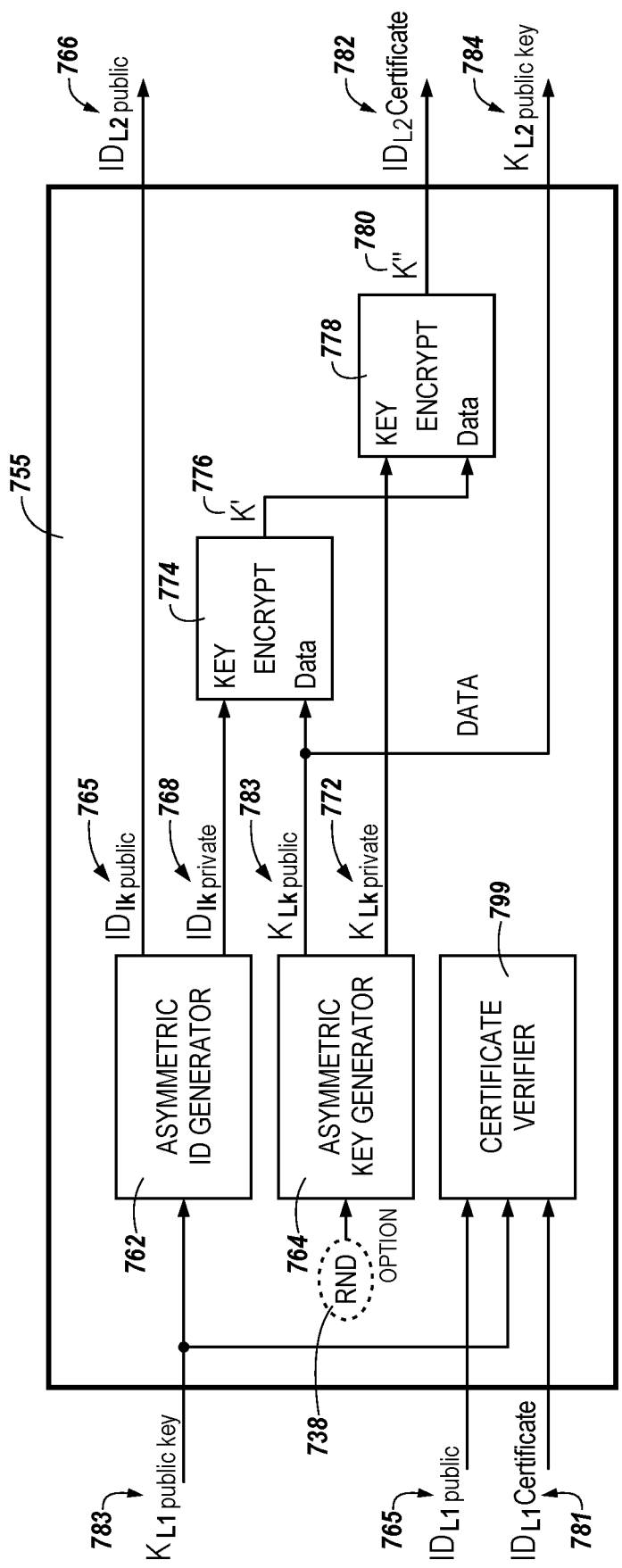
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a network attached device communication component (e.g., network attached device communication component 546 in FIG. 5) generating a network attached device identification ("$ID_{L2}$ public") 766, a network attached device certificate ("$ID_{L2}$ Certificate") 782, and a network attached device public key ("$K_{L2\ public\ key}$") 784.

The network management device public key ("$K_{L1\ public\ key}$") 783 transmitted from Layer 1 of the network management device communication component to Layer 2 755 of a network attached device communication component, as described in FIG. 6, is used by an asymmetric ID generator 762 of the network attached device communication component to generate a public identification ("$ID_{lk\ public}$") 766 and a private identification 768 of the network attached device communication component. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

As shown in FIG. 7, the network management device certificate 781 and public identification 765, along with the network management device public key 783, are used by a certificate verifier 799. The certificate verifier 799 can verify the network management device certificate 781 received from the network management device communication component, and determine, in response to the network management device certificate 781 being verified or not being verified, whether to accept or discard data received from the network management device communication component. Further details of verifying a network attached device certificate 782 are further described herein (e.g., in connection with FIG. 9).

Layer 2 755 of the network attached device communication component can include an asymmetric key generator 764. In at least one example, a random number generator (RND) 638 can optionally input a random number into the asymmetric key generator 764. The asymmetric key generator 764 can generate a public key ("$K_{Lk\ public}$") 783 (referred to as a network attached device public key) and a private key ("$K_{LK\ private}$") 772 (referred to as a network attached device private key) associated with a network attached device communication component such as network attached device communication component 546 in FIG. 5. The network attached device public key 784 can be an input (as "data") into the encryptor 774. The encryptor 774 can generate a result K' 776 using the inputs of the network attached device private identification 768 and the network attached device public key 784. The network attached device private key 772 and the result K' 776 can be input into an additional encryptor 778, resulting in output K" 780. The output K" 780 is the network attached device certificate ("$ID_{L2}$ certificate") 782 transmitted back to the Layer 1 (553 of FIG. 5). The network attached certificate 782 can provide an ability to verify and/or authenticate an origin of data sent from the network attached device communication component. As an example, data sent from the network attached device communication component can be associated with an identity of the network attached device communication component by verifying the certificate, as will be described further in association with FIG. 8. Further, the network attached device public key ("$K_{L2\ public\ key}$") 784 can be transmitted to Layer 1. Therefore, the public identification 766, the certificate 782, and the network attached device public key 784 of the network attached device communication component can be transmitted to Layer 1 of a network management device communication component.

In an example, in response to a network attached device communication component receiving a public key from a network management device communication component, the network attached device communication component can encrypt data to be sent to the network management device communication component using the network management device public key. Vice versa, the network management device communication component can encrypt data to be sent to the network attached device communication component using the network attached device public key. In response to the network attached device communication component receiving data encrypted using the network attached device public key, the network attached device communication component can decrypt the data using its own network attached device private key. Likewise, in response to the network management device communication component receiving data encrypted using the network management device public key, the network management device communication component can decrypt the data using its own network management device private key. As the network attached device private key is not shared with another device outside the network attached device communication component and the network management device private key is not shared with another device outside the network management device communication component, the data sent to the network attached device communication component and the network management device communication component remains secure.

Figure 8:
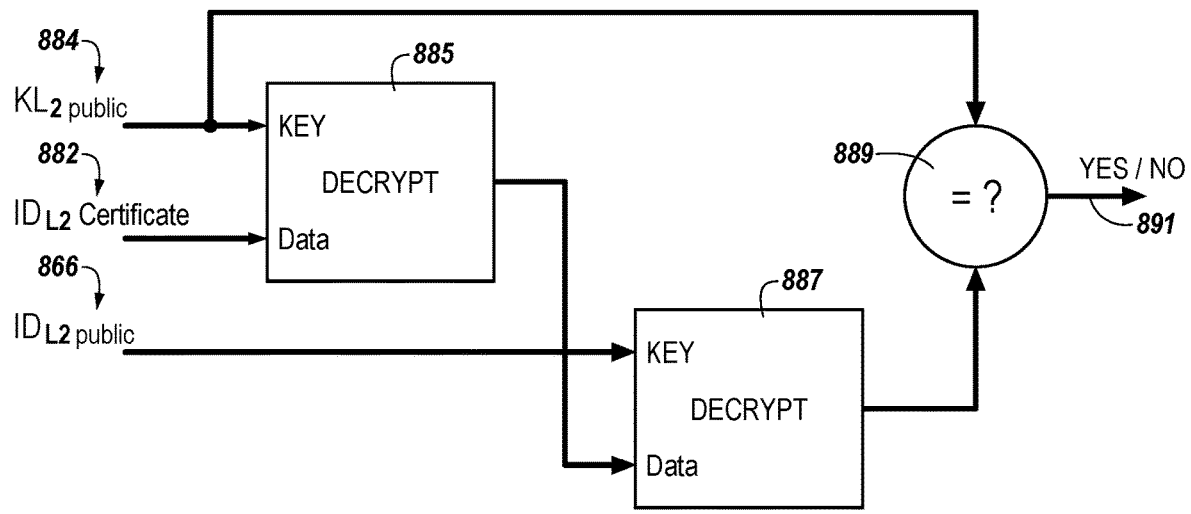
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 884, a certificate 882, and a public identification 866 is provided from a network attached device communication component (e.g., from Layer 2 555 of network attached device communication component 546 in FIG. 5). The data of the certificate 882 and the network attached device public key 884 can be used as inputs into a decryptor 885. The decryptor 885 can be any processor, computing device, etc used to decrypt data. The result of the decryption of the certificate 882 and the remote public key 884 can be used as an input into a secondary decryptor 887 along with the public identification, result in an output. The network attached device public key 884 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
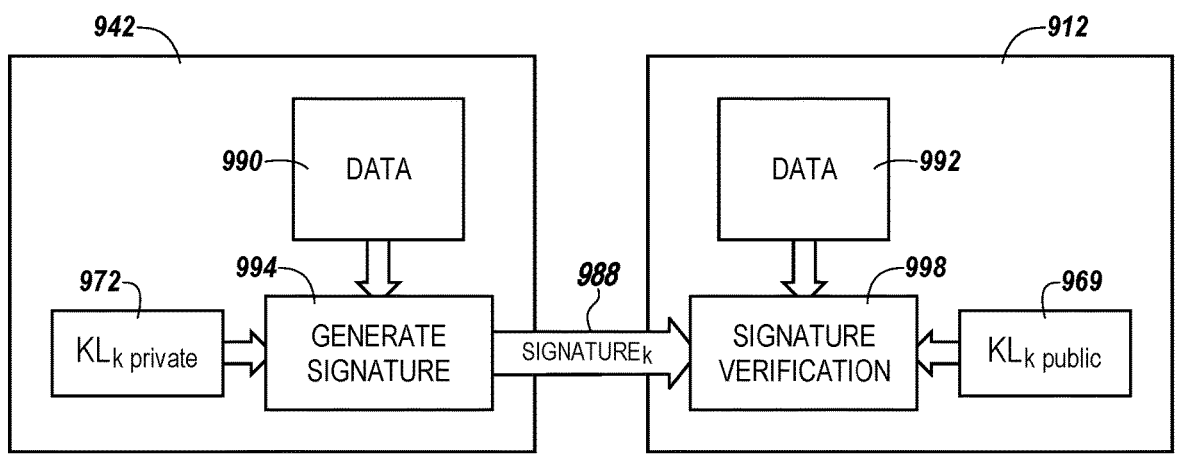
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A network attached device 942 (such as network attached device 142 in FIG. 1) can send data 990 to a network management device 912 (such as network management device 112). The network attached device 942 can generate, at 994, a signature 988 using a network attached device private key 972. The signature 988 can be transmitted to the network management device 912. The network management device 912 can verify, at 998, using data 992 and the network management device public key 969. In this way, signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the network management device can verify the digital signature by using an internal cryptography process (e.g., Elliptical Curve Digital signature (ECDSA) or a similar process.

Figure 10:
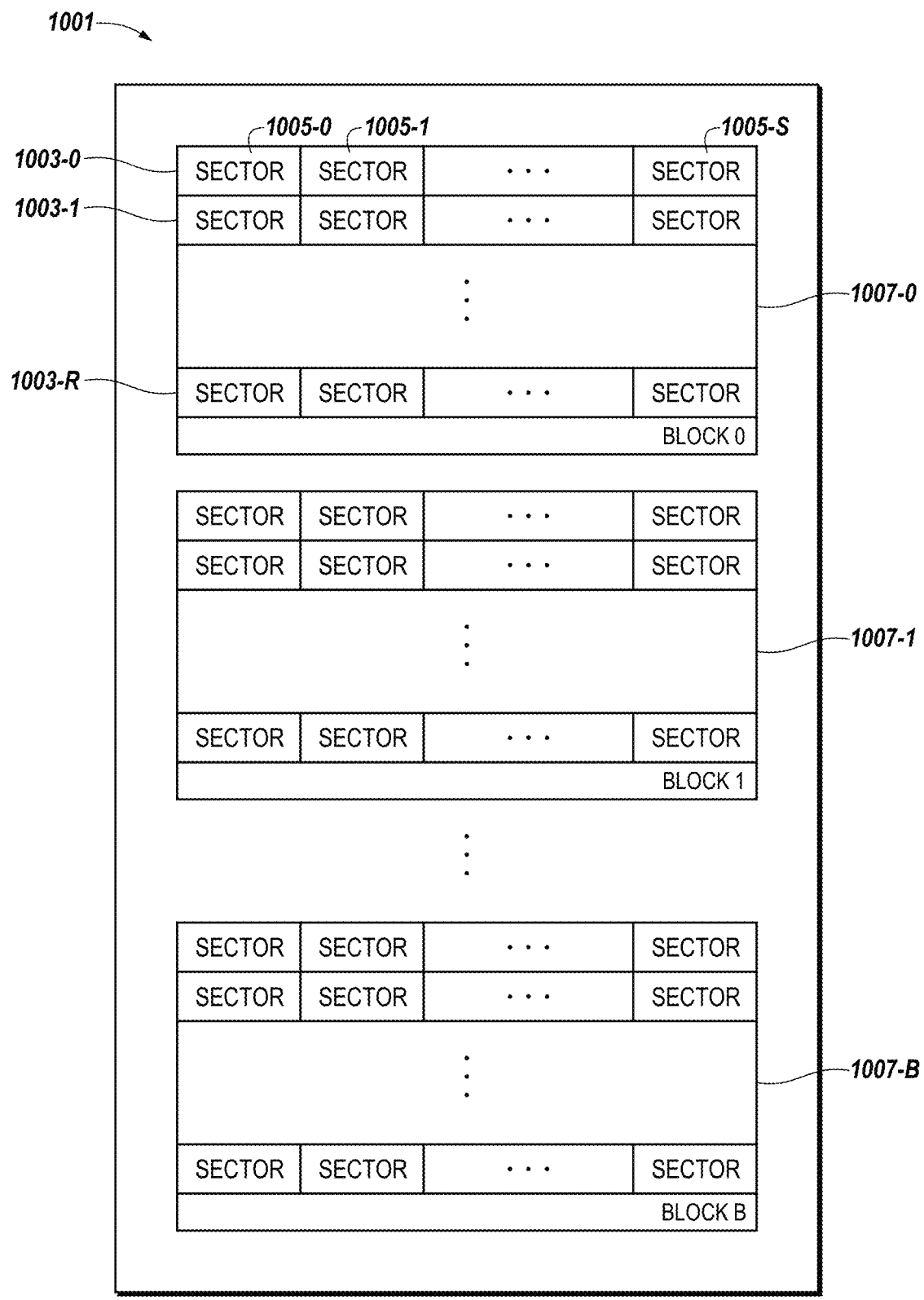
FIG. 10 illustrates a diagram of a portion of a memory array having a number of physical blocks in accordance with an embodiment of the present disclosure.

FIG. 10 illustrates a diagram of a portion of a memory array 1001 having a number of physical blocks in accordance with an embodiment of the present disclosure. Memory array 1001 can be, for example, a flash memory array such as a NAND, and/or NOR flash memory array. In one example embodiment, the memory 1001 is a NOR flash memory array 1001. As an additional example, memory array 1001 can be a resistance variable memory array such as a PCRAM, RRAM, MMRAM, or spin torque transfer (STT) array, among others. However, embodiments of the present disclosure are not limited to a particular type of memory array. Further, memory array 1001 can be a secure memory array, as will be further described herein. Further, although not shown in FIG. 10, memory array 1001 can be located on a particular semiconductor die along with various peripheral circuitry associated with the operation thereof.

As shown in FIG. 10, memory array 1001 has a number of physical blocks 1007-0 (BLOCK 0), 1007-1 (BLOCK 1), . . . , 1007-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 1001.

A number of physical blocks of memory cells (e.g., blocks 1007-0, 1007-1, . . . , 1007-B) can be included in a plane of memory cells, and a number of planes of memory cells can be included on a die. For instance, in the example shown in FIG. 10, each physical block 1007-0, 1007-1, . . . , 1007-B can be part of a single die. That is, the portion of memory array 1001 illustrated in FIG. 10 can be a die of memory cells.

As shown in FIG. 10, each physical block 1007-0, 1007-1, . . . , 1007-B includes a number of physical rows (e.g., 1003-0, 1003-1, . . . , 1003-R) of memory cells coupled to access lines (e.g., word lines). The number of rows (e.g., word lines) in each physical block can be 32, but embodiments are not limited to a particular number of rows 1003-0, 1003-1, . . . , 1003-R per physical block. Further, although not shown in FIG. 10, the memory cells can be coupled to columns of sense lines (e.g., data lines and/or digit lines).

As one of ordinary skill in the art will appreciate, each row 1003-0, 1003-1, . . . , 1003-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 1003-0, 1003-1, . . . , 1003-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 10, a page of memory cells can comprise a number of physical sectors 1005-0, 1005-1, . . . , 1005-S (e.g., subsets of memory cells). Each physical sector 1005-0, 1005-1, . . . , 1005-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 1005-0, 1005-1, . . . , 1005-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 1007-0, 1007-1, . . . , 1007-B, rows 1003-0, 1003-1, . . . , 1003-R, sectors 1005-0, 1005-1, . . . 1005-S, and pages are possible. For example, rows 1003-0, 1003-1, . . . , 1003-R of physical blocks 1007-0, 1007-1, . . . , 1007-B can each store data corresponding to a single logical sector which can include, for example, more or less than 512 bytes of data.

Figure 11A:
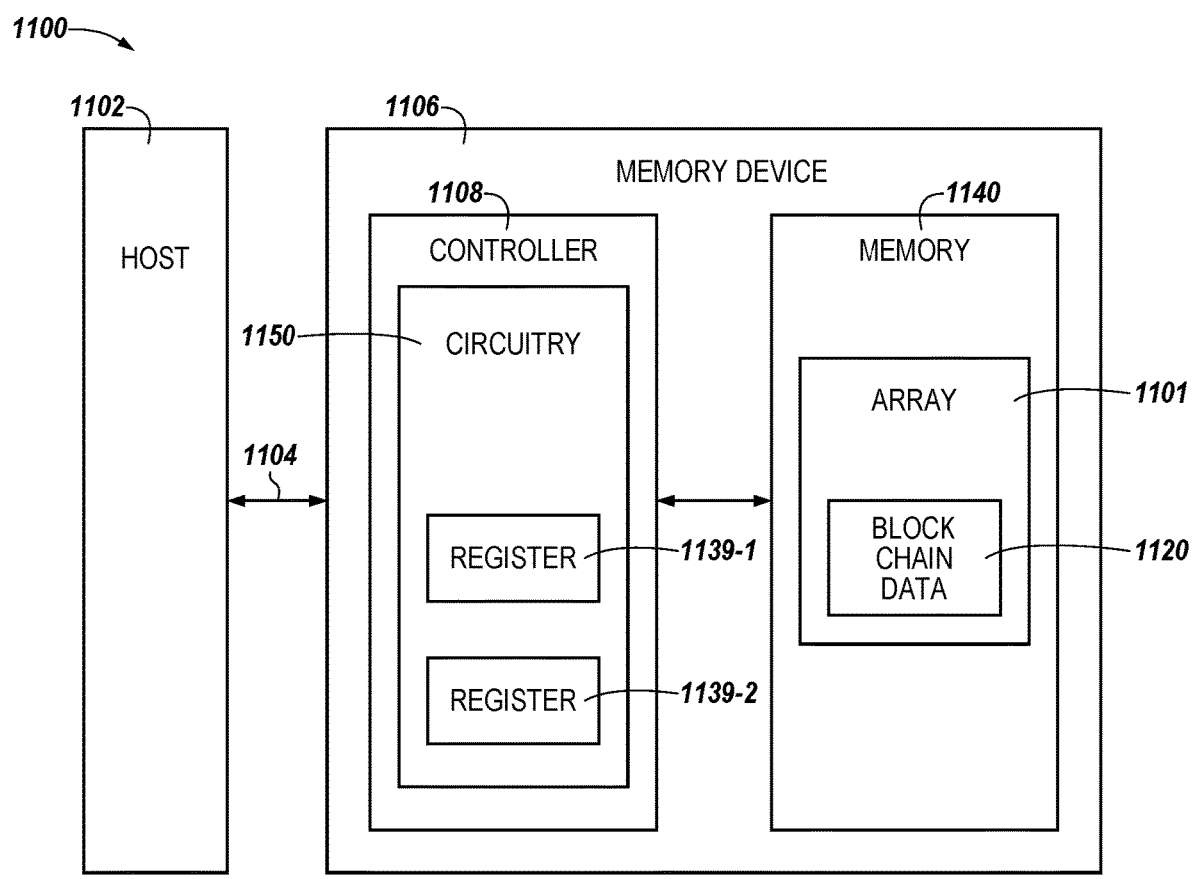
FIG. 11A is a block diagram of a computing system including a host and an apparatus in the form of a memory device in accordance with an embodiment of the present disclosure.

FIG. 11A is a block diagram of a computing system 1100 including a host 1102 and an apparatus in the form of a memory device 1106 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 1106. In one example embodiment, as shown more in FIG. 11B, computing system 1100 may represent a node within a larger network of nodes such as a distributed, peer to peer network.

In the embodiment illustrated in FIG. 11A, memory device 1106 can include a memory 1140 having a memory array 1101. As shown in FIG. 11A, memory 1140 can store "block chain data" 1120, used in block chain technology systems, in the memory array 1101. A "block" of block chain data in a block chain technology system can include data (e.g., payload), headers, encryption, history, timestamps, etc. As will be described further herein in connection with FIGS. 12 and 13, the block chain data 1120 may be "local block chain" data and/or "global block chain" data and may include a stored global block chain ledger (e.g., "global ledger block chain" data) and/or a stored local block chain ledger (e.g., "local ledger block chain" data).

Memory array 1101 can be analogous to memory array 1001 previously described in connection with FIG. 10. However, as used herein a block of block chain data in a block chain architecture does not have to equate to the size of a block of memory as described previously in connection with FIG. 1. Hence, the term "global block" and/or "local block", when stored in memory in memory as block chain data, do not have to equate to a block size unit of memory. A global block and/or local block may be smaller, equivalent, and/or larger than a block size unit, e.g., denomination, associated with a particular memory architecture or design. Further, memory array 1101 can be a secure array, as will be further described herein in connection with FIGS. 14A and 14B. Although one memory array 1101 is illustrated in FIG. 11A, memory 1140 can include any number of memory arrays analogous to memory array 1101.

As illustrated in FIG. 11A, host 1102 can be coupled to the memory device 1106 via interface 1104. Host 1102 and memory device 1106 can communicate (e.g., send commands and/or data such as block chain data 1120) on interface 1104. Host 1102 and/or memory device 1106 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 1104 can be in the form of a standardized physical interface. For example, when memory device 1106 is used for information storage in computing system 1100, interface 1104 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. Interface 1104 can provide an interface for passing control, address, information (e.g., data), and other signals between memory device 1106 and a host (e.g., host 1102) having compatible receptors for interface 1104.

Memory device 1106 includes controller 1108 to communicate with host 1102 and with memory 1140 (e.g., memory array 1101). For instance, controller 1108 can send commands to perform operations on memory array 1101, including operations to sense (e.g., read), program (e.g., write), move, and/or erase data (e.g., "local" and/or "global" block chain data), among other operations. Again, the intended meaning of the terms "global block" and/or "local block" for block chain data in block chain technology and systems are defined in connection with FIGS. 12 and 13.

Controller 1108 can be included on the same physical device (e.g., the same die) as memory 1140. Alternatively, controller 1108 can be included on a separate physical device that is communicatively coupled to the physical device that includes memory 1140. In an embodiment, components of controller 1108 can be spread across multiple physical devices (e.g., some components on the same die as the memory, and some components on a different die, module, or board) as a distributed controller.

Host 1102 can include a host controller (not shown FIG. 11A) to communicate with memory device 1106. The host controller can send commands to memory device 1106 via interface 1104. The host controller can communicate with memory device 1106 and/or the controller 1108 on the memory device 1106 to read, write, and/or erase data (e.g., "local" and/or "global" block chain data), among other operations. Further, in an embodiment, host 1102 can be an IoT enabled device, as previously described herein, having IoT communication capabilities.

Figure 12:
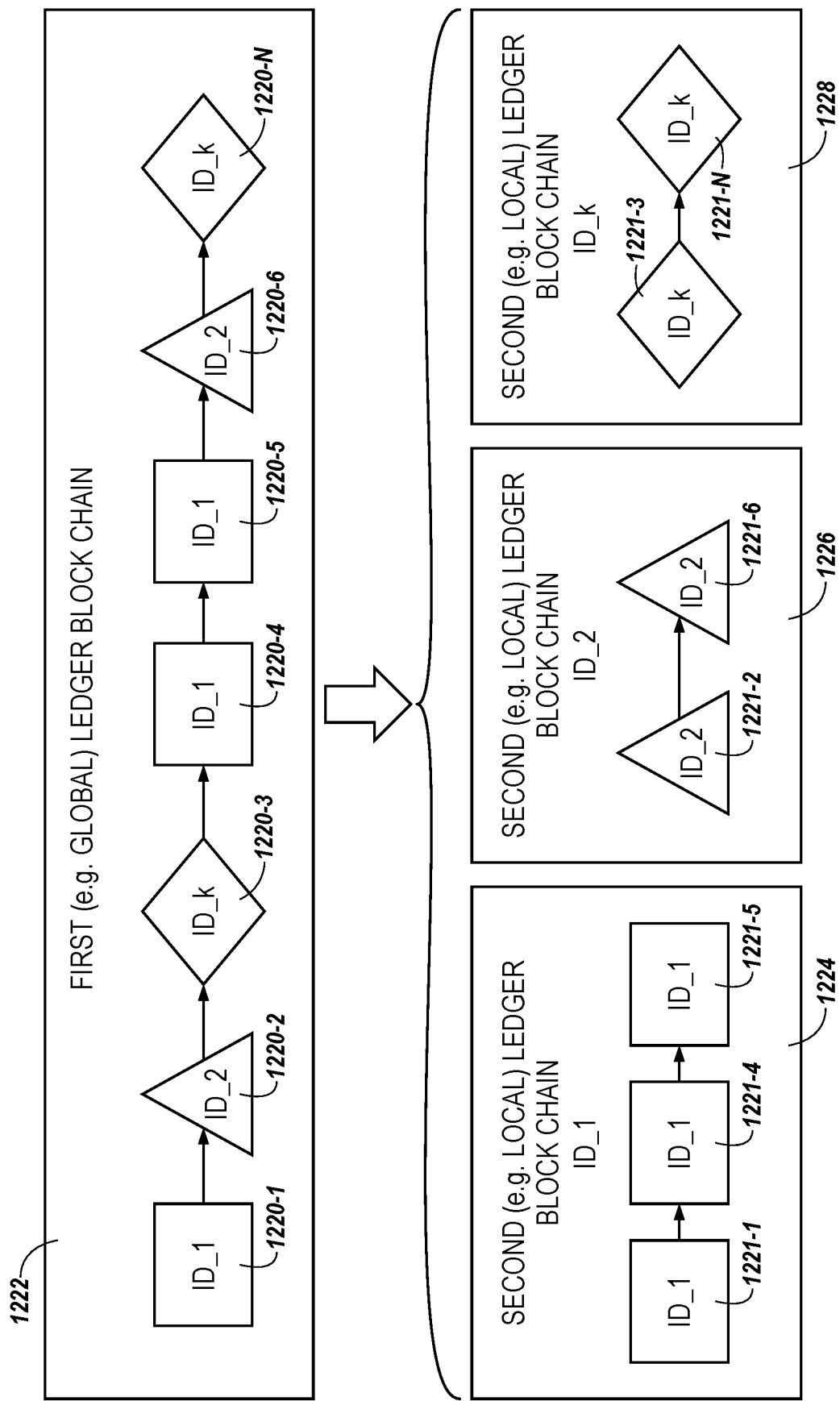
FIG. 12 illustrates an example of an exchange between a global ledger block chain and local ledger block chains as can be operated upon by circuitry and stored in a memory for secure updates stored in memory in accordance with an embodiment of the present disclosure.
Figure 13:
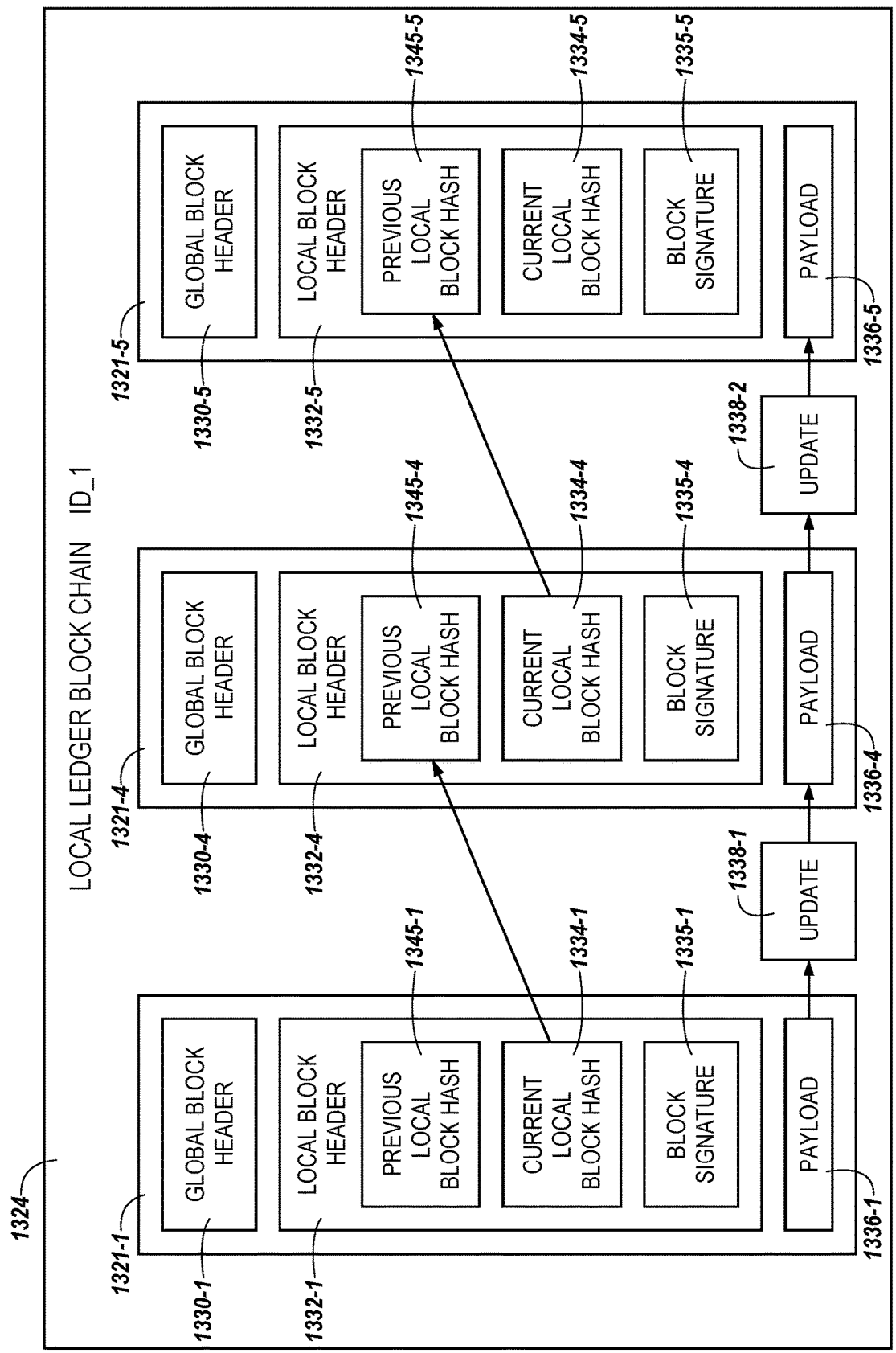
FIG. 13 illustrates an example of a local ledger block chain for secure updates stored in memory in accordance with an embodiment of the present disclosure.

Controller 1108 on memory device 1106 and/or the host controller on host 1102 can include control circuitry and/or logic (e.g., hardware and firmware) configured to perform the block chain operations described herein, e.g., in connection with FIGS. 12 and 13, according to, for example DICE-RIoT architecture and/or protocol. In an embodiment, controller 1108 on memory device 1106 and/or the host controller on host 1102 can be an application specific integrated circuit (ASIC) coupled to a printed circuit board including a physical interface. Also, memory device 1106 and/or host 1102 can include a buffer of volatile and/or non-volatile memory and a number of registers.

For example, as shown in FIG. 11A, memory device can include circuitry 1110. In the embodiment illustrated in FIG. 11A, circuitry 1110 is included in controller 1108. However, embodiments of the present disclosure are not so limited. For instance, in an embodiment, circuitry 1110 may be included in (e.g., on the same die as) memory 1140 (e.g., instead of in controller 1108). Circuitry 1110 can comprise, hardware, firmware, and/or communicate instructions to a processing resource to perform the block chain operations described herein, e.g., in connection with FIGS. 12 and 13 using encryption techniques explained in FIGS. 5-9, according to, for example DICE-RIoT architecture and/or protocol.

For example, circuitry 1110 can be configured to receive a global block of block chain data (defined in FIGS. 12 and 13) to be added as a local block of block chain data, e.g., 1120, on a local ledger block chain (also defined in FIGS. 12 and 13) within an array 1101 in memory 1140. For example, a local block of block chain data, e.g., 1120, may be a validated received global block of block chain data and may be generated and/or added to the local ledger block chain (shown in FIGS. 12 and 13) for validating (e.g., authenticating and/or attesting) a particular vehicular part and/or storing part data stored in memory 1140 (e.g., in memory array 1101). The global block to be added as a local block in the local ledger block chain can include multiple headers.

In an embodiment, a subset of array 1101, or the whole array 1101 can be a secure array (e.g., an area of memory 1140 to be kept under control). FIG. 11A illustrates a pair of registers 1139-1 and 1139-2 although embodiments are not so limited, and one or more registers could be used. For example, the data stored in memory array 1101 can include sensitive (e.g., non-user) data, such as host firmware and/or code to be executed for sensitive applications. In such an embodiment, a pair of non-volatile registers can be used to define the secure array. For example, in the embodiment illustrated in FIG. 11A, circuitry 1110 includes registers 1139-1 and 1139-2 that can be used to define the secure array. For instance, register 1139-1 can define the address (e.g., the starting LBA of the data) of the secure array, and register 1139-2 can define the size (e.g., the ending LBA of the data) of the secure array. An example of such registers, and their use in defining a secure array, will be further described herein in connection with FIGS. 14A-14B).

Once the secure array has been defined, circuitry 1110 can be used to generate (e.g., calculate) a cryptographic hash associated with the secure array, which may be referred to herein as a golden hash, using authenticated and antireplay protected commands (e.g., so that only memory device 1106 knows the golden hash, and only memory device 1106 is capable of generating and updating it). The golden hash may be stored in inaccessible portion of memory array 1101 (e.g., the same inaccessible portion in which block chain data 1120 and the local ledger block chain is stored) and can be used during the process of validating the data of the secure array.

In one example embodiment, memory device 1106 (e.g., using circuitry 1110) can send, via interface 1104, the block chain data 1120 (which may be a received global block from the global ledger block chain), along with the digital signature associated with block chain data 1120, to the host 1102 for validation of the part data (e.g., the payload of the block chain data) before updating data stored in memory array 1101. For example, circuitry 1110 can sense (e.g., read) the block chain data 1120 received and stored in memory array 1101, and send the sensed block chain data 1120 to host 1102 for validation of the part data stored in array 1101, responsive to a powering (e.g., a powering on and/or powering up) of memory device 1106. As such, a validation of the part data stored in memory array 1101 can be initiated (e.g., automatically) upon the powering of memory device 1106.

As an additional example, circuitry 1110 can send the block chain data 1120, along with the digital signature associated with block chain data 1120, to host 1102 upon an external entity, such as host 1102, initiating a validation of an part data stored in memory array 1101. For instance, host 1102 can send a command to memory device 1106 (e.g., circuitry 1110) to sense the block chain data 1120, and circuitry 1110 can operate on the command to sense the block chain data 1120 and send the sensed block chain data 1120 to host 1102 for validation of the data stored in array 1101, responsive to receipt of the command.

Upon receiving the block chain data 1120, host 1102 can validate (e.g., determine whether to validate) the data stored in memory array 1101 using the received block (e.g., the payload of the received global block). For example, as will be explained further in connection with FIGS. 12 and 13, host 1102 can use the cryptographic hash of the previous block in the block chain and the cryptographic hash of the data stored in memory array 1101 to validate the data. Further, host 1102 can validate the digital signature associated with the block chain data 1120 to determine the local block is included (e.g., is eligible to be included) in the local ledger block chain. As used herein, validating the part data stored in memory array 1101 can include, and/or refer to, authenticating and/or attesting that the part data is genuine (e.g., is authorized or authenticated to communicate with the vehicular entity), and has not been altered by hacking activity, frequently provided by a hacker, or other including unauthorized changes.

In embodiments in which memory array 1101 is a secure array, a golden hash, as described further in connection with FIGS. 12 and 13, may also be used to validate the part data stored in memory array 1101. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1102.

In one example embodiment, in addition to the validation of the data stored in memory array 1101, circuitry 1110 can validate the block chain data 1120 (e.g., the received global block from the global ledger block chain) to determine if the block chain data 1120 is from an authorized entity (e.g., a known entity), and that the hash indicated on the received block chain data 1120 matches the most recent local block of block chain data on the local ledger block chain. In response to the validation of the block chain data 1120, the circuitry 1110 can be configured to allow communication between the vehicular part and the vehicular entity.

As will be explained further in connection with FIGS. 12 and 13, after the validation of the block chain data 1120 serving as a local block in a local ledger block chain stored in memory array 1101, circuitry 1110 can generate an additional (e.g., the next) local block (e.g., receive the next global block form the global ledger block chain) to be added to the local ledger block chain for validating part data stored in memory array 1101, in a manner analogous to which the previous block chain data 1120 was generated/received. For example, this additional local block of block chain data 1120 can include a cryptographic hash of the previous block in the local ledger block chain, and a new cryptographic hash of a new part data stored in memory array 1101. Further, this additional local block can include a header having a timestamp indicating when this block was generated (e.g., received as an additional global block), and can have a digital signature associated therewith that indicates this additional local block is from an authorized entity and may be included in the local ledger block chain. An example illustrating such an additional local block will be further described herein (e.g., in connection with FIG. 3). Further, in embodiments in which memory array 1101 is a secure array, an additional (e.g., new) golden hash can be generated.

The additional local block of block chain data, as well as the digital signature associated with the additional local block, and the additional golden hash, can be stored in memory array 1101 as part of the local ledger block chain. For example, the additional local block can replace the block chain data 1120 (e.g., the previous block chain data 1120) in memory array 1101. The additional block chain data, digital signature, and additional golden hash can then be used by host 1102 to validate the part data stored in memory array 1101, in a manner analogous to that previously described herein for block chain data 1120. Additional local blocks in the local ledger block chain can continue to be generated by circuitry 1110 when they are received as global blocks, validated by the host 1102, and used by host 1102 to validate the part data stored in memory array 1101, in such manner throughout the lifetime of memory device 1106.

The embodiment illustrated in FIG. 11A can include additional circuitry, logic, and/or components not illustrated so as not to obscure embodiments of the present disclosure. For example, memory device 1106 can include address circuitry to latch address signals provided over I/O connectors through I/O circuitry. Address signals can be received and decoded by a row decoder and a column decoder, to access memory array 1101. Further, memory device 1106 can include a main memory, such as, for instance, a DRAM or SDRAM, that is separate from and/or in addition to memory array 1101. An example further illustrating additional circuitry, logic, and/or components of memory device 1106 will be further described herein (e.g., in connection with FIG. 15).

Figure 11B:
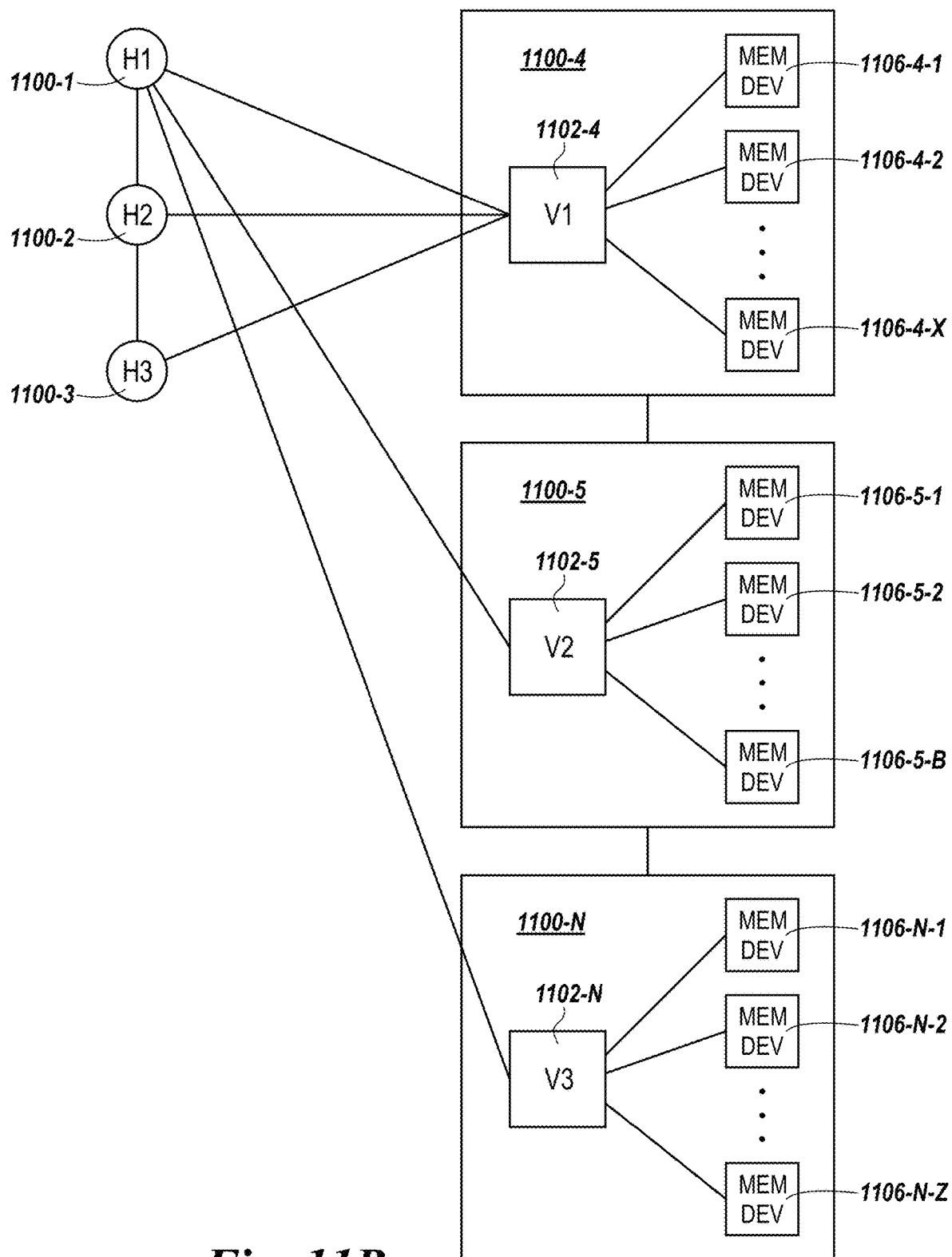
FIG. 11B is a block diagram of a network of computing systems which can include many computing nodes in a public and/or private network connected in a wired and/or wireless manner using wireless protocols such as peer to peer to peer and Internet Protocol (IP) in accordance with an embodiment of the present disclosure.

FIG. 11B is a block diagram of a network of computing systems which can include many computing nodes in a public and/or private distributed network, such as a peer to peer network, connected in a wired and/or wireless manner using wireless protocols and Internet Protocol (IP) in accordance with an embodiment of the present disclosure. In the example of FIG. 11B, multiple nodes, 1100-1, 1100-2, 1100-3, . . . , 1100-N, are shown connected in a network such as a peer to peer network. The network can support a distributed ledger technology (DLT) such as "block chain" technology. A distributed ledger is a database that is spread over several nodes or computing devices.

A "block chain" is a continuously growing, encrypted list of records. Block chain is one form of a DLT in which multiple nodes, 1100-1, 1100-2, 1100-3, . . . , 1100-N, can share and store the distributed list of records in a peer to peer network manner. As described herein a "block" in block chain is collection of information, e.g., data, headers, transactions, encryption, etc. A block may be added to the growing list of records in the ledger if it is validated. Blocks are added to the block chain ledger in chronological order.

Hence, in the example of FIG. 11B, a given node, 1100-1 (H1), 1100-2 (H2), 1100-3 (H3), . . . , 1100-N, may maintain a copy of a current list or records in ledger. The multiple nodes, 1100-1, 1100-2, 1100-3, . . . , 1100-N, may each represent a different host, e.g., computing device with processing resources. For ease of illustration, the hosts or multiple nodes, 1100-1, 1100-2, 1100-3, . . . , 1100-N, may be considered in relation to a block chain for autonomous and/or non-autonomous transportation vehicles, cars, buses, emergency vehicles, etc. Embodiments, however, are not limited to this example.

In this example, a public or private entity's (e.g., a military entity, an airport manager, a hotel owner, a hospital entity, etc.) servers may represent one node, e.g., 1100-1, on the network of nodes, 1100-1, 1100-2, 1100-3, . . . , 1100-N, shown in FIG. 11B. A certified repair facility such as a dealership repair shop may represent another node, e.g., 1100-2. Node 1100-3 may be another host, e.g., another computing device, connected to the peer to peer network via the Internet and/or other wireless connections.

The public or private entity associated with node 1100-1 may maintain a "first block chain ledger" having chronologically linked blocks of data related to a particular subject matter associated with node 1100-1, e.g., maintain a first block chain ledger for all the vehicles associated with that public or private entity. For ease of illustration, and not by way of limitation, the referenced "first block chain ledger", having chronologically linked blocks of data related to a particular subject matter associate with a particular node, e.g., for all the vehicles associated with a given public or private entity, may also be referred to herein as a "global block chain ledger" (or, "global ledger block chain"). The public or private entity can distribute the first block chain ledger ("global ledger block chain") to other nodes, 1100-2, 1100-3, etc., in the peer to peer network and to its vehicles, connected as nodes to the network, in a wired and/or wireless manner. Various wireless communication technologies can be utilized in communicating with different nodes, 1100-1, 1100-2, 1100-3, . . . , 1100-N. For example, different generations of broadband mobile telecommunication technologies (e.g., first through fifth generation (1-5G)), device-to-device (e.g., vehicle to vehicle (v2v)), to communication including Bluetooth, Zigbee, and/or LTE device-to-device communication technologies, and/or other wireless communication utilizing an intermediary devices (e.g., WiFi utilizing an access point (AP)) may be utilized in communicating with different nodes.

In the example of FIG. 11B, node 1100-4 may represent a particular vehicle belonging to a subset or class of vehicles associated with a public or private entity by the particular public or private entity represented by node 1100-1. In this example, node 1100-5 may represent a vehicular part or set of vehicular parts, related to or associated with the same or different subset or class of vehicles associated with the public or private entity or, alternatively, not be related to the public or private entity associated with node 1100-1. Similarly, node 1100-N may represent another particular vehicle or vehicular parts, in the same or different subset or class of vehicles and/or vehicular parts associated with the public or private entity or, alternatively, not be related to the public or private entity associated with node 1100-1.

Each node may have its own processing resource, e.g., host connected to one or more memory devices such as illustrated in FIG. 11A. Thus, vehicle nodes 1100-4, 1100-5, and 1100-N may each include a single and/or multiple host, e.g., processing resources, 1102-4, 1102-5, 1102-N, respectively. Each host on a given vehicle node, 1100-4, 1100-5, and 1100-N, may connect to multiple memory devices on each vehicle and/or vehicular part. For example, memory devices 1106-41, 1106-4-2, 1106-4-X may be associated with host 1102-4 on node 1100-4, memory devices 1106-51, 1106-52, and 1106-5-B may be associated with host 1102-5 on node 1100-5, and memory devices 1106-N-1, 1106-N-2, and 1106-N-Z may be associated with host 1102-N on node 1100-N.

In this example, node 1100-1 may regularly send, e.g, distribute, to nodes 1100-4, 1100-5, . . . , and 1100-N an updated copy of the continuously growing first, e.g. "global", block chain ledger (also referred to herein as "global ledger block chain") maintained by node 1100-1 containing chronological blocks, e.g., data, related to the subject matter of all the vehicles associated with the public or private entity. According to block chain technology, node 1100-1 may share a copy of the first, e.g., "global", ledger block chain with other nodes, 1100-1, 1100-2, 1100-3, . . . , 1100-N in the distributed network. However, not all of the "blocks" in the growing first, e.g., "global" ledger block chain maintained by node 1100-1 and received to other particular nodes, 1100-4, 1100-5, . . . , 1100-N, may be authentic and/or relevant to other particular nodes. For example, particular vehicles, e.g., nodes 1100-4, 1100-5, . . . , 1100-N, may belong to a subset or sub-class of vehicles or parts associated with the public or private entity associated with node 1100-1, but only particular blocks in the first, e.g., "global", ledger block chain may relate to a particular node 1100-4, 1100-5, . . . , 1100-N, e.g., particular vehicle or part, in that subset or sub-class of vehicles or parts. As such, according to embodiments disclosed herein, a particular node, 1100-4, 1100-5, . . . , 1100-N, may validate only those blocks authenticated and relevant to that node, 1100-4, 1100-5, . . . , 1100-N.

According to example embodiments, a particular node, e.g., 1100-4, may validate and add blocks, authenticated and relevant to the node, to a second block chain ledger which may be a subset of fewer than all of the blocks contained in the global ledger block chain received from node 1100-1 to node 1100-4. Node 1100-4 may store the subset of the "global ledger block chain" as a "local block chain ledger" (also referred to herein as "local ledger block chain") on the respective node, 1100-4, 1100-5, . . . , 1100-N. Node 1100-4 may also share the local ledger block chain with other nodes. However, the same is not required and the local ledger block chain is termed "local" in that it may remain "local" only to that particular node 1100-4, e.g., the host and/or memory devices of a particular vehicle. Thus, for ease of illustration, the second block chain ledger ("local ledger block chain") may be referred to herein as a local ledger block chain. The node, e.g., 1100-4, may receive many global blocks associated with other global ledger block chains, pertaining to various subject matter, via the network of nodes to which it is connected. However, the node, e.g., 1100-4, may be selective as to which blocks it accepts add allows to be added to its local ledger block chain. As an example, particular vehicular parts associated with a vehicle may be added to a local ledger block chain associated with a particular vehicular entity and vehicular parts not associated with the particular vehicular entity would not be added to the local ledger block chain. As explained in greater detail in connection with FIGS. 12 and 13, embodiments of the present disclosure may use the encryption techniques described in FIGS. 5-9 to validate and add blocks relevant to a particular node, 1100-4, 1100-5, . . . , 1100-N, and store and maintain those blocks on the particular node, 1100-4, 1100-5, . . . , 1100-N, as a "local ledger block chain" data, e.g., as secure communication between a vehicular entity and a vehicular part. In one example, a single host (such as shown in FIG. 11A) or multiple host on a particular vehicle or part, e.g., nodes 1100-4, 1100-5, . . . , 1100-N, can maintain a local ledger block chain. As an example, a single or multiple host can maintain a distributed ledger on the node according to techniques described in co-pending, co-filed U.S. application Ser. No. 16/362,792, entitled "USING MEMORY AS A BLOCK IN A BLOCK CHAIN". In this example, a firmware update relevant to a particular vehicle, e.g, node 1100-4, 1100-5, . . . , 1100-N, may be validated and added to the "local ledger block chain" of the node, 1100-4, 1100-5, . . . , 1100-N, or alternatively discarded.

FIG. 12 illustrates an example of an exchange between a global ledger block chain 1222 and local ledger block chains 1224, 1226, and 1228 as can be operated upon by circuitry and stored in a memory and/or secure array, e.g., by circuitry 1110 and memory 1140 in FIG. 11A. In this example secure updates to data may be validated and stored in memory such as memory array 1101 described in connection with FIG. 11A. As used herein, block" according to block chain technology in a block chain ledger or system can include data (e.g., payload), headers, encryption, history, timestamps, etc. Again, a "block" in a block chain does not have to correlate to or equate to the size of a block of memory, as explained as a storage unit of memory in FIG. 10.

Further, as used herein, the term "global block" is a block in the first block ledger which in the example is maintained and shared across a larger system or network of entities. A "local block" is a block only in a local ledger block chain, maintained as a subset of data relevant to a particular node, e.g., 1100-4, as a subset of particular subject matter relevant to a subset of vehicles or more specific class of entities within a system or network of entities (such as vehicular parts), e.g., memory device 1101 in FIG. 11A. Neither a global block or a local block chain have to equate to a block size of a particular memory architecture. A global block and/or local block may be smaller, equivalent, and/or larger than a block size denomination associated with a particular memory architecture or design.

As shown in FIG. 12, a first, e.g., global ledger block chain 1222 can be related to subject matter associated with node 1100-1 in FIG. 11B. The global ledger block chain can include global blocks 1220-1, 1220-2, 1220-3, 1220-4, 1220-5, 1220-6, and 1220-N. When operated upon by circuitry and logic described herein, the global blocks 1220 can be validated and accepted into second, e.g., local, ledger block chains 1224, 1226, and 1228, shown as local blocks 1221-1, 1221-2, 1221-3, 1221-4, 1221-5, 1221-6, and 1221-N. Second, e.g., local, ledger block chains 1224, 1226, and 1228 may be maintained by nodes 1100-4, 1100-5, . . . , 1100-N shown in FIG. 11B, respectively therein. Alternatively, if not validated to a local ledger block chain maintained on a particular node, e.g., nodes 1100-4, 1100-5, . . . , 1100-N shown in FIG. 11B, the respective global blocks of the global ledger block chain can be rejected therefrom.

For example, when global block chain data is received by a particular memory to be validated and stored as a local block within local ledger block chain, global block chain data has to be validated by circuitry and logic, e.g., circuitry 1110 in FIG. 11A, before it becomes a local block within local ledger block chain. In the example of FIG. 12, global block 1220-1 has been validated, e.g., by circuitry 1110, to become local block 1221-1 in local ledger block chain 1224, global block 1220-2 has been validated to become local block 1221-2 in local ledger block chain 1226, global block 1220-3 has been validated to become local block 1221-3 in local ledger block chain 1228, global block 1220-4 has been validated to become local block 1221-4 in local ledger block chain 1224, global block 1220-5 has been validated to become local block 1221-5 in local ledger block chain 1224, global block 1220-6 has been validated to become local block 1221-6 in local ledger block chain 1226, and global block 1220-N has been validated to become local block 1221-N in local ledger block chain 1228.

In one example embodiment, the global blocks 1220 can be received to a memory device, e.g., 1101 in FIG. 11A, validated, and added (e.g., generated) to a local ledger block chain 1224, 1226, or 1228, by using the circuitry 1110 described in FIG. 11A. In the example of FIG. 12, global block 1220-4 has been received and validated to become local block 1221-4. Local block 1221-4 can be added to the local ledger block chain 1224 after local block 1221-1 has been validated by the circuitry and logic described herein. As described further in connection with FIG. 13, local block 1221-1 is used to validate global block 1220-4 as an update of data stored in the memory. In this example, local block 1221-4 can be accepted and stored as the next block in the local ledger block chain 1224 after local block 1221-1). The global ledger block chain 1222 can include blocks in a block chain configuration, architecture, and/or protocol from multiple hosts (e.g., the host 1102 described in connection with FIG. 11A).

A host and/or memory may maintain, e.g., store, local ledger block chains 1224, 1226, 1228 and include only the validated global blocks that are relevant to a particular host and/or memory. As an example, a local ledger block chain associated with a particular entry node may only store data that relates to traffic in and out of that entry point as blocks in that particular local ledger block chain. Global blocks 1220 may include identifiers for a particular host and/or memory associated with the data included in the global block. For example, local ledger block chain 1224 is shown associated with a particular host/memory identifier (ID_1). Thus, circuitry associated with this host/memory relationship will validate only related global blocks such that local ledger block chain 1224 will include only local blocks 1221-1 (global block 1220-1 from global ledger block chain 1220), local block 1221-4 (global block 1220-4 from global ledger block chain 1220), and local block 1221-5 (global block 1220-5 from global ledger block chain 1220). As an example, local ledger block chain 1224 may be associated with a first entry node (e.g., entry node 333-1). Local ledger block chain 1226 is shown associated with another host and/or memory identifier (ID_2). As an example, local ledger block chain 1226 may be associated with a second entry node (e.g., entry node 333-2). Thus, circuitry associated with this host/memory relationship will validate only related global blocks such that local ledger block chain 1226 will include local block 1221-2 (global block 1220-2 from global ledger block chain 1220), and local block 1221-6 (global block 1220-6 from global ledger block chain 1220). Local ledger block chain 1228 is shown associated with another host and/or memory identifier (ID_k) (e.g., a third entry node such as entry node 333-3 in FIG. 3). Thus, circuitry associated with this host/memory relationship will validate only related global blocks (related to all entry points into a location) such that local ledger block chain 1228 will include the local block 1221-3 (global block 1220-3 from global ledger block chain 1220), and local block 1221-N (global block 1220-N from global ledger block chain) as these blocks pertain to that particular entry node or access point.

Using a local ledger block chain (e.g., 1224, 1226, 1228) to store appropriate block chain data associated with validation or authorization of vehicular parts to the memory of a respective host and/or memory relationship (e.g., ID_1, ID_2, and ID_k) can provide secure updates to data stored in a given memory device (e.g., the memory device 1106 of FIG. 11A) in association with a given host. As such, the circuitry and logic described herein allow for the exchange and organization shown in FIG. 12. For example, circuitry is configured to receive a global block e.g., 1220-4 from a global ledger block chain 1222 and determine whether the global block 1220-4 is related to a particular the host and/or memory relationship. If the global block 1220-4 is related to the particular host and/or memory, e.g., a comparison of encrypted hash for respective identifiers (e.g., ID_1, ID_2, and ID_k) according to block chain techniques match, the circuitry may add the global block 1220-4 to its local ledger block chain 1224. Global block 1220-4 of block chain data can include a payload of an update to data included in a secure array associated with the host and/or memory. The circuitry described herein, e.g., circuitry 1110, may validate the global block 1220-4 by checking, e.g., comparing, a cryptographic hash of a current local block e.g., 1221-1 in the local ledger block chain 1224 and a cryptographic hash of the data associated with a vehicular part, contained in global block 1220-4. The current local block 1221-1 of the local ledger block chain 1224 also has a digital signature associated therewith which is similarly compared to indicate whether the global block 1220-4 is from an authorized entity (e.g., includes an identifier ID_1 evidencing that global block 1220-4 is from an entity associated with the particular host and/or memory relationship including the local ledger block chain 1224). As explained in connection with FIG. 13, if validated the current local block 1221-1 will become the "previous" local block and global block 1220-4 will become the then "current" local block 1221-4 in the local ledger block chain 1224. The contents of the local blocks 1221 of the local ledger block chain 1224 (e.g., and/or 1226, 1228) are described in detail in connection with FIG. 13.

An authorized entity may provide the global ledger block chain 1222 as a public ledger which may be distributed to all and/or a portion of the hosts and/or memory that concur the global ledger block chain 1222 to receive access to a particular location. For example, the global ledger block chain 1222 may be generated and maintained by an entity which may monitor a plurality of vehicles and/or parts of vehicles. For example, the global ledger block chain 1222 may be generated and monitored by a public or private entity (e.g., a mechanic shop, a car dealership, a military entity, an airport manager, a hotel owner, a hospital entity, etc.) that then monitors particular vehicles and their associated vehicle parts. Each of the global blocks 1220 within the global ledger block chain 1222 may include vehicle and vehicle part data for a vehicle and/or its parts with a particular identifier. For instance, as illustrated by FIG. 12, the global blocks 1220-1, 1220-4, 1220-5 correspond to host and/or memory ID_1, global blocks 1220-2, 1220-6, correspond to host and/or memory ID_2, and global blocks 1220-3, 1220-N correspond to host and/or memory ID_k. Where the different ID's correspond to a different host and/or memory relationship (e.g., different vehicles/different parts).

In this instance, the public or private entity generates and monitors the global ledger block chain 1222 such that each instance of an update of a vehicle and/or its corresponding parts generated for particular vehicles (e.g., or a particular subset of vehicles sharing the identifier) is recorded as an immutable record in the global ledger block chain 1222. For example, global block 1220-1 includes an update for a vehicle (e.g., or data in the memory associated with the vehicle) associate with ID_1, global block 1220-2 includes an update for vehicles associated with ID_2 and so on. The global blocks 1220 are assembled in sequential order as they are produced by the public or private entity and each global block 1220 can include a digital signature indicating the particular vehicle and/or particular vehicle part. In this way, the public or private entity may keep an immutable record of all of the updates (e.g., vehicles and associated parts.) generated for the different vehicles monitored.

As used in block chain technology, and described more in connection with FIG. 13, the global blocks 1220 in the global ledger block chain 1222 can include multiple headers and encryption. For example, the global block of a global ledger block chain can include a global block header including a cryptographic hash data (e.g., a link to) to the previous global block and a hash including a cryptographic hash data to a previous local block. Thus, when the global block is received by the host 1102 and/or memory device 1106 in FIG. 11A, the global block to be added to the local ledger block chain can include a cryptographic hash (e.g., a link to) a current local block (e.g., in block chain data 1120) in the local ledger block chain and a cryptographic hash of the update to data stored in the memory device 1106 (e.g., a payload). The block chain data 1120 in a local ledger block chain can also include a digital signature associated therewith that indicates that the global block is from an authorized entity.

Stated differently, a global block from a global ledger block chain may be received by the host and/or the memory, e.g., host 1102 and/or memory 1140 shown in FIG. 11A, and the circuitry and/or logic on the host and/or the memory may determine if the global block is related to the host and/or the memory. If so, the global block and its contents may be validated to become a new local block of block chain data stored in a local ledger block chain (e.g., as part of block chain data 1120 stored on the array 1101 of the memory 1140 in FIG. 11A). The local block can also include a header having a timestamp indicating when the local block was generated/received.

The cryptographic hash of the data stored in a memory array, e.g., memory array 1101 of FIG. 11A) to be updated, altered, configured, an/or otherwise changed by the data included in the received/generated local blocks, and/or the cryptographic hash of the previous local block in the local ledger block chain, can comprise, for instance, a SHA-256 cryptographic hash. Further, the cryptographic hash of the data stored in memory array, and the cryptographic hash of the previous local block in the local ledger block chain, can each respectively comprise 256 bytes of data.

The cryptographic hash of the data stored in memory array can be generated (e.g., calculated), by circuitry, e.g., circuitry 1110 in FIG. 11A. In such an example, the cryptographic hash of the data stored can be internally generated by memory device, e.g., memory device 1106 in FIG. 11A, without having external data moving on a host/memory device interface, e.g., interface 1104 in FIG. 11A. As an additional example, the cryptographic hash of the data can be communicated from an external entity. For instance, a host can generate the cryptographic hash of the data stored in a memory array and send the generated cryptographic hash to a memory device e.g., circuitry of the memory device can receive the cryptographic hash of the data stored in memory array from host.

Further, a digital signature associated with a local block can be generated (e.g., calculated), by circuitry based on (e.g., responsive to) an external command, such as a command received from a host. The digital signature can be generated using symmetric or asymmetric cryptography. The digital signature may include a freshness field in the form of the previous local block on the global ledger block chain (which should match the current local block on the local ledger block chain when the block is added). As an additional example, a host can generate the digital signature, and send (e.g. provide) the generated digital signature to a memory device.

The freshness field, described herein, may change with each global block that is added to the local ledger block chain. Accordingly, the freshness field may be used to validate the incoming global block is the correct block to be added as the next block in the local ledger block chain. The incoming global block is verified to be the next local block to be added to the local ledger when the digital signature indicates that the incoming global block is related to the host, and the previous local block field (the freshness) of the incoming global block is the same as the current local block in the local ledger block chain. Because the freshness can also be used to calculate the digital signature, the digital signature can be different with each incoming global block.

As mentioned, the digital signature can be, for instance, a digital signature generated using asymmetric cryptography (e.g., based on a public and/or private key), and can comprise, for instance, an elliptical curve digital signature. As an additional example, the signature can be generated using symmetric cryptography (e.g., based on a unique secret key shared between a host and a memory device). The secret key can be exchanged by using any asymmetric protocol (e.g., the Diffie-Hellman protocol). In other examples, the key may be shared with a host in a secure environment (e.g., factory production, secure manufacturing, as a vehicle is associated with a public or private entity, etc.). The generation and validation of the secret key is discussed further in connection with FIGS. 5-9.

As described in connection with FIG. 11A, such block chain data 1120 can be stored in a memory array, e.g., memory array 1101 in FIG. 11A. The block chain data 1120 can be stored in a portion of memory array 1101 that is inaccessible to a user of memory device and/or host (e.g., in a "hidden" region of memory array). Storing a local block and/or local ledger block chain of block chain data in a particular memory array can simplify the storage of the local block by removing the need for software storage management for the local block.

In the example of FIG. 12, global block 1220-6 can include a global header having a field for a hash of a previous global block 1220-5, where the previous global block field indicates the preceding block in the global ledger block chain 1222. A different hash in the global header can include a previous local block field, where the previous local block field indicates the preceding global block with an identifier of same host and/or memory ID.

For example, global block 1220-6 may include a local block field with a hash for global block 1220-2 (the previous related global block) because they are both vehicle ID_2. In this way, a particular host and/or memory device relationship (e.g., for a vehicle and/or it parts) may receive multiple global blocks 1220 from the global ledger block chain 1222, and determine which global blocks 1220 to accept as a local blocks and which global blocks 1220 to discard.

For example, the local ledger block chain 1224 may be included in a memory device and/or memory associated with a particular host through an identifier in the form of a host (e.g., a vehicle) with ID_1. The circuitry as described herein can be configured to store global blocks 1220 in the memory associated with the host vehicle as part of the local ledger block chain 1224. In other words, the circuitry is configured to receive multiple global blocks 1220 from the global ledger block chain 1222, and when the circuitry determines that the global block(s) 1220 belong to the host vehicle associated with vehicle ID_1, they are accepted as local blocks 1221 and added to the local ledger block chain 1224.

Specifically, in an example, a host vehicle and/or memory associated with the host vehicle with an ID_1 includes, e.g., may store, the local ledger block chain 1224 and the circuitry and/or memory may receive multiple global blocks 1220-1, 1220-2, 1220-3, 1220-4, 1220-5, 1220-6, and 1220-N from the global ledger block chain 1222. The circuitry is configured to determine whether the multiple global blocks 1220 received from the global ledger block chain 1222, by the circuitry are related to the host vehicle and/or memory associated with the host vehicle ID_1. Thus, the circuitry may determine that the global blocks 1220-1, 1220-4, and 1220-5 are related to the host vehicle ID_1, and the circuitry is configured to validate and, if validated, to sequentially add global blocks 1220-1, 1220-4, 1220-5 of the multiple global blocks received from the global ledger block chain 1222 to the local ledger block chain 1224 as local blocks 1221-1, 1221-4, and 1221-5 because it has been verified that they are related to the host vehicle ID 1. In another example, a determination of whether the multiple global blocks 1220 are related to a particular gate of a location. In this way, different blocks can be sorted and associated with different entities where one local block chain ledger may be associated with a vehicle (including all its corresponding vehicular parts) and another local block chain ledger may be associated with another vehicle (and its corresponding parts), etc.

In one example, the global blocks 1220-1, 1220-4, and 1220-5 can be added (sequentially) to the local ledger block chain 1224 when a previous local block field in each of the respective global blocks 1220 matches a current local block field in the current local block of the local ledger block chain 1224. Specifically, the circuitry can validate the incoming global block 1220-4 by confirming that the global block 1220-4 is from an authorized entity (e.g., the vehicle identity in the global ledger block chain 1222) and checking that the previous local block field of global block 1220-4 is a hash for local block 1221-1 (which is the same as the global block 1220-1), and checking that the current local block 1221-1 has a matching hash in its own current local block field. This procedure can be applied to add the global block 1220-5 to the local ledger block chain 1224. Thus, the global blocks 1220-1, 1220-4, and 1220-5 can become local blocks 1221-1, 1221-4, and 1221-5 in the local ledger block chain 1224. Using this method and configuration, the local ledger block chain 1224 includes multiple local blocks related to a host and/or memory associated with (ID_1) assembled in sequential order.

Additionally, the circuitry is configured to refrain from adding global blocks 1220 to the local ledger block chain 1224, when they are unrelated to the host and/or memory ID_1. Thus, the circuitry may determine that global blocks 1220-2, 1220-6, 1220-3, and 1220-N are not related to the host and/or memory ID_1 and may discard the unrelated global blocks from local ledger block chain 1224. The mechanisms described in connection with FIG. 12 may be applied to multiple hosts and/or multiple memories e.g., local ledger block chain 1226, and local ledger block chain 1228.

For example, the circuitry may generate a local ledger block chain (e.g., 1224) for validating an update to data stored in the memory (e.g., associated with ID_1) and receive global blocks (e.g., 1220-1, 1220-2, 1220-3, 1220-4, 1220-5, 1220-6, 1220-N) from a global ledger block chain 1222. The circuitry may add a first portion (e.g., 1220-1, 1220-4, 1220-5) of the global blocks to the local ledger block chain 1224 when a digital signature associated with each of the global blocks of the first portion is verified by the circuitry to be related to the host and/or memory (e.g., ID_1). The circuitry may discard a second portion (e.g., 1220-2, 1220-6, 1220-3, 1220-N) of the received global blocks when the second portion of the global blocks are determined to be unrelated to the host and/or memory associated with ID_1, (e.g., the second portion is associated with ID_2, and/or ID_k).

As is described further in connection with FIG. 13, a freshness field may be used by the circuitry to verify a global block belongs in the local ledger block chain (e.g., 1224, 1226, 1228). In the example above, each of the global blocks of the first portion (e.g., 1220-1, 1220-4, 1220-5) include a freshness field used to generate the digital signature. The freshness field for each of the global blocks of the first portion (e.g., 1220-1, 1220-4, 1220-5) corresponds to a current local block of the local ledger block chain 1224. As such, the global blocks of the first portion (e.g., 1220-1, 1220-4, 1220-5) are added to the local ledger block chain 1224 in sequential order (as local blocks 1221-1, 1221-4, and 1221-5) and stored in the memory associated with the host.

Specifically, the circuitry can generate a digital signature based on a freshness field of the global block. For instance, the circuitry may generate the freshness field of global block 1220-4 by identifying a previous local block field in the header of the global block 1220-4 (in this instance, this would be a hash of global block 1220-1 because it is the previous global block with the ID_1). Where the current local block 1221-1 of the local ledger block chain 1224 and the previous local block field (again, in this instance this would be global block 1220-1) of the global block 1220-4 of the global ledger block chain 1222 are the same.

FIG. 13 illustrates an example of a local ledger block chain (e.g., local ledger block chain 1324) for secure updates stored in memory (e.g. in memory array 1101 previously described in connection with FIG. 11A) in accordance with an embodiment of the present disclosure. The local ledger block chain 1324 can be similar to the local ledger block chain 1224 described in connection with FIG. 12. For ease of illustration, FIG. 13 illustrates only local ledger block chain 1324. However, examples described in connection with FIG. 13, and local ledger block chain 1324, may also be applied for other local ledger block chains (e.g., local ledger block chains 1226 and 1228 described in connection with FIG. 3). Local ledger block chain 1324 is a block chain used for secure monitoring of traffic entering and exiting a location and/or roadway using data stored in a memory of a respective host and/or memory exchange. As one example, the host and/or memory exchange is associated with a particular identifier, e.g., identifier ID_1.

In this example, the local blocks 1321-1, 1321-4, 1321-5 of the local ledger block chain 1324 are blocks that were received as, e.g., previously, global blocks 1220-1, 1220-4, 1220-5 in the example of FIG. 3). In one example, circuitry 1110 in FIG. 11A operates on the received global blocks using block chain encryption and decryption techniques described in connection with FIGS. 5-9 to compare and validate respective a hash of the block chain data, e. g., using an SHA256 hash. When the global blocks are verified as being related to the host and/or memory (e.g., ID_1), they may become local blocks 1321-1, 1321-4, and 1321-5 and be stored as an immutable record in the local ledger block chain 1324 for the host and/or memory associated with ID_1. In this example, circuitry operates to compare a block chain hash for local block 1321-4 (e.g., previously global block 1320-4) to local block 1321-1 (e.g., previously global block 1220-1), for storage in the memory associated with the host ID_1. Once validated by the circuitry associated with the host and/or memory, the circuitry may link to the local block 1321-1. Likewise, local block 1321-5 (e.g., previously global block 1220-5) once validated by the circuitry associated with the host and/or memory may link to the local block 1321-4.

In the example of FIG. 13, each local block (e.g., 1321-1, 1321-4, and/or 1321-5 etc.) may respectively include the following information: a global block header, e.g., 1330-1, 1330-4, 1330-5, and a local block header, e.g., 1332-1, 1332-4, 1332-5. In this example, each local block header 1332-1, 1332-4, 1332-5 includes a previous local block hash 1345-1, 1345-4, 1345-5, a current local block hash 1334-1, 1334-4, 1332-5, and a block signature 1335-1, 1335-4, 1335-5. As shown in the example of FIG. 13, each local block, e.g., 1321-1, 1321-4, and 1321-5, includes a payload, e.g., 1336-1, 1336-4, 1336-5 as part of the block's information, e.g., data. As mentioned in connection with FIG. 3, each of the blocks (e.g., global and local) may include multiple headers (e.g., 1330-1, 1332-1) to link a current block to a previous block in their respective block chain ledgers (global or local).

For example, referring to the method of adding local block 1321-4 to the local ledger block chain 1324, the global block header 1330-4 may include a freshness field in the form of a hash for a previous global block having the same associated ID_1 within the global ledger block chain, as well as a hash for the current global block (to link the global ledger block chain together). Put another way, when the global block (e.g., 1220-4 of FIG. 12) is in a global ledger block chain (e.g., 1222 of FIG. 12), the freshness field in the global block header is a hash for a previous global block (e.g., 1220-1 of FIG. 12) having the same associated identifier (e.g., ID_1) in the global ledger block chain (e.g., 1222 of FIG. 12). In this example, when local block 1321-4 is being verified to be added to the local ledger block chain 1324, the current local block hash 1334-1 of the local block 1321-1 in the local ledger block chain 1324 will be the same as the freshness field in the global block header 1330-4 when the circuitry validates the incoming global block (e.g., 1220-4) to add it to the local ledger block chain 1324 as local block 1321-4. Put even another way, the freshness field of the of the global block header 1330-4 should match the current local block hash 1334-1 of the local block 1321-1 of the local ledger block chain 1324 because the current local block 1321-1 was previously global block 1220-1.

The local block headers e.g., 1332-1, 1332-4, and 1332-5 each respectively include a previous local block hash e.g., 1345-1, 1345-4, and 1345-5 (to link together the local ledger block chain 1324), and a current local block hash e.g., 1334-1, 1334-4, and 1334-5 (which is the same as an incoming global block freshness field), and block signatures e.g., 1335-1, 1335-4, 1335-5 to indicate that the block is from an authorized entity (e.g., a listed vehicle identity and/or an entity associated with a host and/or memory) and related to the host and/or memory (e.g., ID_1). The payload e.g., 1336-1, 1336-4, and 1336-5 can be data which includes a hardware, configuration, and/or software update (e.g., configuration, change in configuration, alteration to a device of the host and/or memory associated with the host, etc.) and and/or a cryptographic hash of the data stored in the memory to be updated.

For example, a host, in the form of a vehicle and/or memory associated with the vehicle having an identifier of ID_1, may include a memory and circuitry to generate a local ledger block chain 1324 for validating an update to data stored in the memory. In this example, the local ledger block chain 1324 is comprised of local block 1321-4 (e.g., global block 1220-4 of FIG. 12) taken from a global ledger block chain (e.g., 1222 of FIG. 12). The local block 1321-4 includes a current local block cryptographic hash 1334-4 of the current local block 1321-4. The current local block cryptographic hash 1334-4 may be compared to a previous local block cryptographic hash 1345-4 which was current local block hash 1334-1, as a freshness field to validate an order (e.g., a sequence) and link the local ledger block chain 1324 and a cryptographic hash of data stored in the memory to be updated (e.g., the payload 1336-1, 1336-4, and 1336-5). The local block 1321-4 of the local ledger block chain 1324 has a digital signature 1335-4 associated therewith that indicates the global block (e.g., 1220-4 of FIG. 12) was from an authorized entity and was correctly added as the local block 1321-4. In some examples, the authorized entity may be a public or private entity associated with the vehicles which is monitoring all vehicles associated with the public or private entity. In this way, the host and/or memory associated with ID_1 may check the block signature (e.g., 1335-4) and may discard global blocks received from the global ledger block chain (e.g., the global ledger block chain 1322) that are not related to the host and/or memory associated with ID 1.

The host and/or memory ID_1 can be configured to receive the local ledger block chain 1324 from the memory, validate the update (e.g., the payload 1336-1, 1336-4, and 1336-5) to the data stored in the memory using the received local ledger block chain 1324. In this way, the host and/or memory associated with ID 1 can maintain and/or monitor each of the updates provided to the host and/or memory from the authorized entity. Because the assembly of the local ledger block chain 1324 generates an immutable record, the circuitry may maintain control over what updates have taken place. This may prevent fraudulent updates, unintentional changes, unintentional error, and nefarious hacking attempts. Additionally, the maintenance of a local ledger block chain 1324 on the memory associated with the host can provide a record of updates which may be produced upon demand. After a global block from the global ledger block chain (e.g., the global ledger block chain 1222 of FIG. 12) has been validated and added to the local ledger block chain 1324, the circuitry may implement the update included in the payload e.g., 1336-1, 1336-4, and 1336-5.

For example, the local ledger block chain 1324 may validate a global block (e.g., the global block 1220-1 of FIG. 12) and add it to the local ledger block chain 1324 as the local block 1321-1. After the validation, the circuitry can execute the update 1388-1 included in the payload 1336-1 of the local block 1321-1. As an example, the payload 1336-1 and/or the update 1388-1 can include authentication data (e.g., authentication data 441, 443 corresponding to a respective vehicular entity or vehicular part). The authorized entity may push another update to the host and/or memory associated with ID_1, as such, the circuitry may receive a second global block (e.g., the global block 1220-4 of FIG. 12) which may be validated by the circuitry and added sequentially as local block 1321-4, linked to local block 1321-1. The circuitry may check and compare a cryptographic hash of a freshness field e.g., previous local block hash 1345-4. If valid, this validation and linking in the local ledger block chain 1324, the circuitry may execute the update 1388-2 included in the payload 1336-4 of local block 1321-4. Using this method, the memory may continue to add global blocks as local blocks to the local ledger block chain 1324 as described for local block 1321-5, etc. In some examples, the host and/or memory associated with ID_1 may remove an older portion of the local ledger block chain 1324 to create vacancy in the memory as the local ledger block chain 1324 increases when more updates are generated by the authorized entity.

For example, the host and/or memory may be a computing device of a vehicle having an ID_1, and the local ledger block chain 1324 can indicate updates associated with authentication of a vehicle and/or its corresponding parts in software and/or hardware components on-board the vehicle. The computing device may include a threshold amount of immutable records that can be stored in the memory. In some examples, updates (e.g., 1388-1, 1388-2) are pushed from the authorized entity via global blocks to update a software and/or hardware component of the computing device, the circuitry may remove a local block (e.g., an older local block) from the local ledger block chain 1324 when the local ledger block chain 1324 has reached the threshold. The circuitry may remove an older local block (e.g., 1321-1) to create vacancy in the memory of the computing device for a newer local block (e.g., 1321-5) by executing firmware to alter the root (e.g., the root of the consensus, root of a Merkle tree, etc.) of the local ledger block chain 1324. In this way, the circuitry can maintain control of the updates as the local ledger block chain 1324 adds new local blocks.

In one embodiment, the above described global block chain and local ledger block chains can be used to securely monitor communication between vehicles and corresponding vehicle parts. As an example, as a part of a vehicle is installed, repaired, reinstalled, etc., the part can communicate with the vehicle and use authentication data that uses the ledge block chain describes above to authenticate such communication exchanged between the vehicle and a vehicle part to securely verify identities of the vehicle and the part. The part can use the global block chain to verify the identity of the vehicle and any access data related to that particular vehicle. However, if the vehicle associated with the part, a block can be added to the global block chain that indicates the vehicle has been associated with the part. The local ledger block chains can be used to pinpoint which vehicle is associated with which vehicle part without having to monitor the entire global block chain.

Figure 14A:
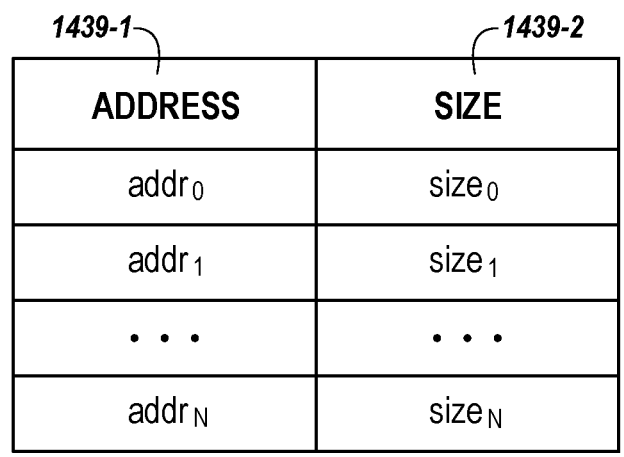
FIG. 14A illustrates an example of a pair of registers used to define a secure memory array in accordance with an embodiment of the present disclosure.
Figure 14B:
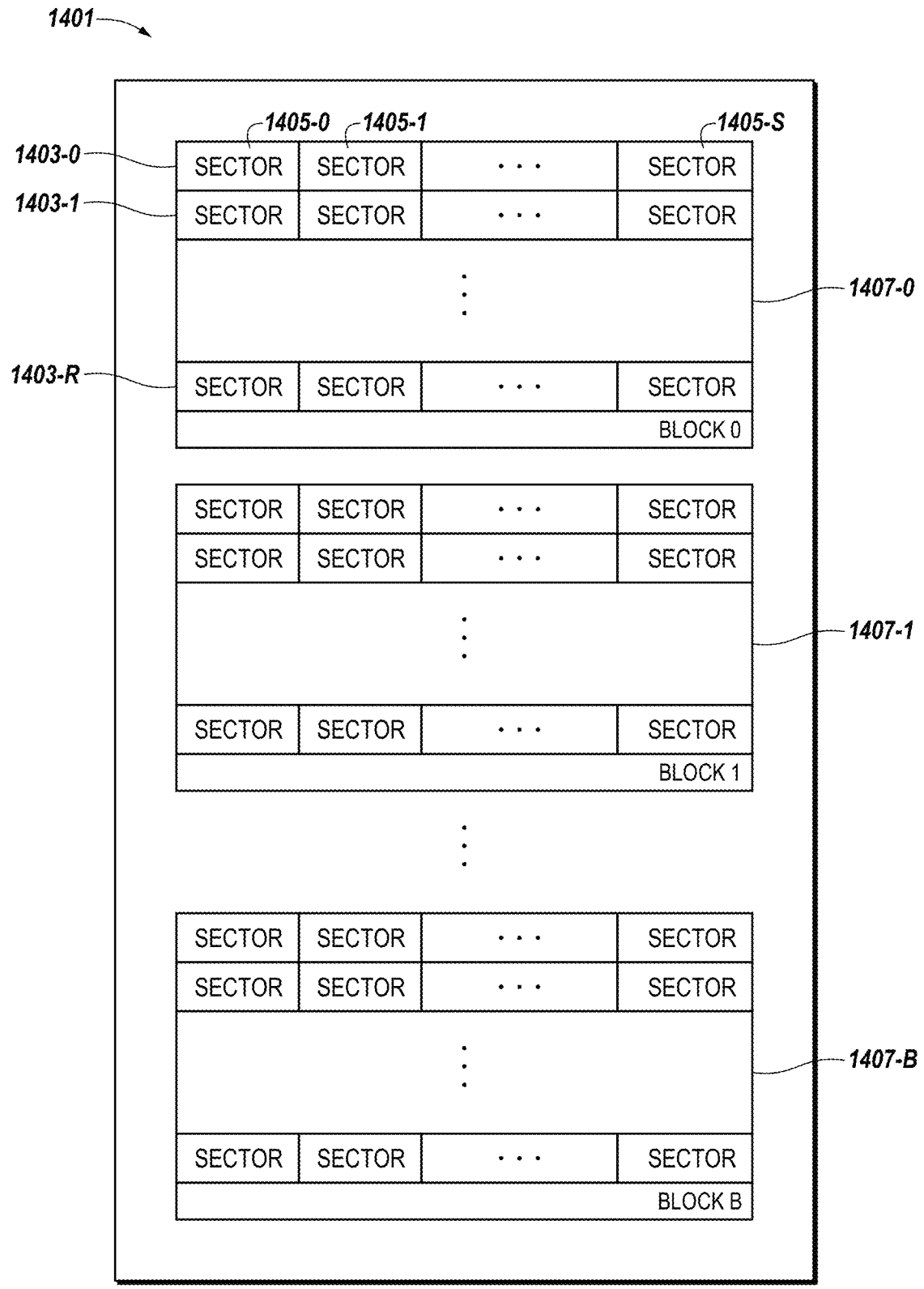
FIG. 14B illustrates a diagram of a portion of a memory array that includes a secure memory array defined in accordance with an embodiment of the present disclosure.

FIG. 14A illustrates an example of a pair of registers 1439-1 and 1439-2 used to define a secure memory array in accordance with an embodiment of the present disclosure, and FIG. 14B illustrates a diagram of a portion of a memory array 1401 that includes a secure memory array defined using registers 1439-1 and 1439-2 in accordance with an embodiment of the present disclosure. Registers 1439-1 and 1439-2 can be, for instance, registers 1139-1 and 1139-2, respectively, previously described in connection with FIG. 11A, and secure memory array 1401 can be, for instance, memory array 1101 previously described in connection with FIG. 11A. For instance, as shown in FIG. 14B, secure memory array 1401 can include a number of physical blocks 1407-0, 1407-1, . . . , 1407-B of memory cells, each including a number of physical rows 1403-0, 1403-1, . . . , 1403-R having a number of sectors of memory cells, in a manner analogous to memory array 1001 previously described in connection with FIG. 10.

As shown in FIG. 14A, register 1439-1 can define addresses of the secure array (e.g., the addresses of different portions of the secure array), and register 1439-2 can define sizes of the secure array (e.g., the sizes of the different portions of the secure array). The addresses of the secure array defined by register 1439-1 can correspond to, for instance, starting points (e.g., starting LBAs) of the secure array (e.g., the starting points of the different portions of the secure array), and the sizes of the secure array defined by register 1439-2 can correspond to, for instance, ending points (e.g., ending LBAs) of the secure array (e.g., the ending points of the different portions of the secure array).

For example, as shown in FIG. 14A, registers 1439-1 and 1439-2 can define N pairs of values, with each respective pair comprising an address value (e.g., addr) defined by register 1439-1 and a size value (e.g., size) defined by register 1439-2. For instance, in the example illustrated in FIG. 14A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_1]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 1439-2 is zero can stop the definition of the secure array. For instance, in the example illustrated in FIG. 14A, if the size value of $Pair_2$ is zero, then the secure array would be given by: $[addr_0, addr_0+size_0] \cup [addr_1, addr_1+size_1]$.

An example of a secure array defined by registers 1439-1 and 1439-2 (e.g., with all size values defined by register 1439-2 as non-zero) is illustrated in FIG. 14B. For instance, as shown in FIG. 14B, the address (e.g., LBA) associated with sector 1405-0 of memory array 1401 is $addr_0$, the address associated with sector 1405-1 of memory array 1401 is $addr_0+size_0$, the address associated with sector 1405-2 of memory array 1401 is $addr_1$, the address associated with sector 1405-3 of memory array 1401 is $addr_1+size_1$, the address associated with sector 1405-4 of memory array 1401 is $addr_N$, and the address associated with sector 1405-5 of memory array 1401 is $addr_N+size_N$. As such, the secure array comprises sectors (e.g., the data stored in sectors) 1405-0 through 1405-1, sectors 1405-2 through 1405-3, and 1405-4 through 1405-5. However, the sectors of memory array 1401 that are before sector 1405-0, and sectors 1405-1 through 1405-2 of memory array 1401, are not part of the secure array (e.g., the secure array comprises a subset of array 1401).

Figure 15:
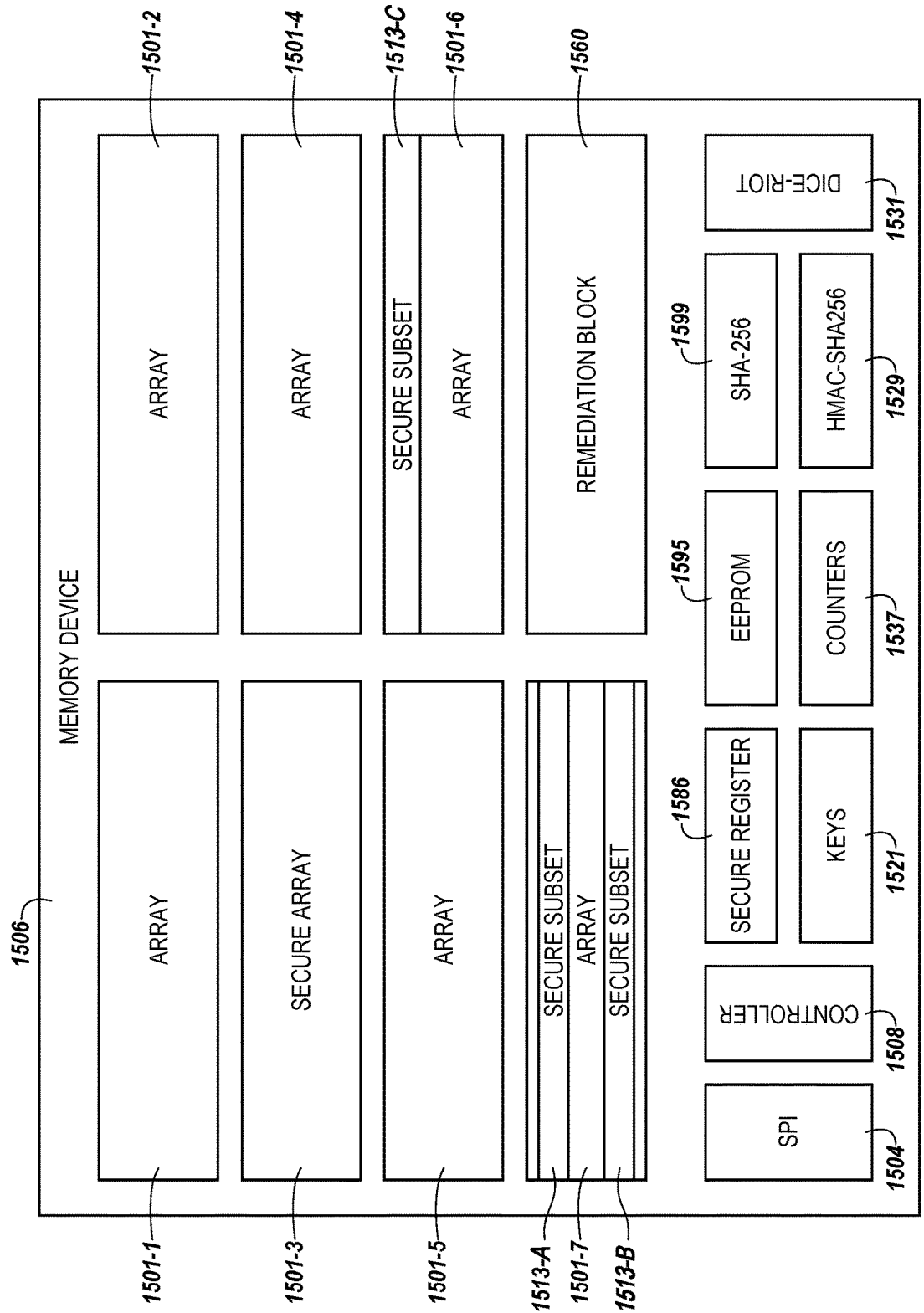
FIG. 15 is a block diagram of an example network management device apparatus in accordance with an embodiment of the present disclosure.

FIG. 15 is a block diagram of an example memory device 1506 in accordance with an embodiment of the present disclosure. Memory device 1506 can be, for example, memory device 1106 previously described in connection with FIG. 11A.

As shown in FIG. 15, memory device 1506 can include a number of memory arrays 1501-1 through 1501-7. Memory arrays 1501-1 through 1501-7 can be analogous to memory array 1001 previously described in connection with FIG. 10.

Further, in the example illustrated in FIG. 15, memory array 1501-3 is a secure array, subset 1513-C of memory array 1501-6 comprises a secure array, and subsets 1513-A and 1513-B of memory array 1501-7 comprise a secure array. Subsets 1513-A, 1513-B, and 1513-C can each include, for instance, 4 kilobytes of data. However, embodiments of the present disclosure are not limited to a particular number or arrangement of memory arrays or secure arrays.

As shown in FIG. 15, memory device 1506 can include a remediation (e.g., recovery) block 1560. Remediation block 1560 can be used as a source of data in case of errors (e.g., mismatches) that may occur during operation of memory device 1506. Remediation block 1560 may be outside of the area of memory device 1506 that is addressable by a host.

As shown in FIG. 15, memory device 1506 can include a serial peripheral interface (SPI) 1504 and a controller 1508. Memory device 1506 can use SPI 1504 and controller 1508 to communicate with a host and memory arrays 1501-1 through 1501-7, as previously described herein (e.g., in connection with FIG. 11A).

As shown in FIG. 15, memory device 1506 can include a secure register 1586 for managing the security of memory device 1506. For example, secure register 1586 can configure, and communicate externally, to an application controller. Further, secure register 1586 may be modifiable by an authentication command.

As shown in FIG. 15, memory device 1506 can include keys 1521. For instance, memory device 1506 can include eight different slots to store keys such as root keys, DICE-RIOT keys, and/or other external session keys.

As shown in FIG. 15, memory device 1506 can include an electronically erasable programmable read-only memory (EEPROM) 1595. EEPROM 1595 can provide a secure non-volatile area available for a host, in which individual bytes of data can be erased and programmed.

As shown in FIG. 15, memory device 1506 can include counters (e.g., monotonic counters) 1537. Counters 1537 can be used as an anti-replay mechanism (e.g., freshness generator) for commands (e.g., to sign a command set or sequence) received from and/or sent to a host. For instance, memory device 1506 can include six different monotonic counters, two of which may be used by memory device 1506 for the authenticated commands, and four of which may be used by the host.

As shown in FIG. 15, memory device 1506 can include an SHA-256 cryptographic hash function 1599, and/or an HMAC-SHA256 cryptographic hash function 1529. SHA-256 and/or HMAC-SHA256 cryptographic hash functions 1599 and 1529 can be used by memory device 1506 to generate cryptographic hashes, such as, for instance, a golden hash used to validate the data stored in memory arrays 1501-1 through 1501-7 as previously described herein. Further, memory device 1506 can support L0 and L1 of DICE-RIOT 1531.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
    a memory having instructions executable by a controller; and
    a network management communication circuitry coupled to the controller and configured to receive a public key, integrated into layers of a device identification composition engine and robust internet of things (DICE and RIoT) protocol, and an encrypted random string value from communication circuitry of a network attached device in response to sending public information to the network attached device, sending a command to the network attached device, and recognizing, by the network attached device, the public information within the layers of the DICE and RIoT protocol, wherein the layers of the DICE and RIoT protocol include:
    a first layer of the DICE and RIoT protocol that is located in the network management communication circuitry and is configured to provide a secret key to a second layer of the DICE and RIoT protocol;
    the second layer of the DICE and RIoT protocol that is located in the network management communication circuitry and is configured to use the secret key to generate public information, private information, the public key and a private key; and
    a third layer of the DICE and RIoT protocol that is located in the network attached device and is configured to receive data from the second layer and execute operations involving the data, wherein the data includes the public information and the public key.

2. The apparatus of claim 1, wherein the network management communication circuitry is further configured to decrypt the encrypted random string value received from the network attached device.

3. The apparatus of claim 1, wherein the network management communication circuitry is further configured to send, to the communication circuitry of the network attached device, a message and a signature to authenticate independent of the type of the network attached device.

4. The apparatus of claim 1, wherein the network management communication circuitry is further configured to couple to the network attached device prior to receiving the encrypted random string value from the communication circuitry of the network attached device.

5. The apparatus of claim 1, wherein the encrypted random string value includes integers and characters.

6. An apparatus comprising:
    a memory having instructions executable by a controller; and
    network attached device communication circuitry coupled to the controller and configured to:

generate a public key, integrated into layers of a device identification composition engine and robust internet of things (DICE and RIoT) protocol, and a random string value; and send, to communication circuitry of a network management device, the random string value and the public key in response to recognizing public information within the layers of the DICE and RIoT protocol, wherein:

a first layer of the DICE and RIoT protocol is located in network management communication circuitry and configured to provide a secret key to a second layer of the DICE and RIoT protocol;

the second layer of the DICE and RIoT protocol is located in the network management communication circuitry and configured to use the secret key to generate public information, private information, the public key and a private key; and a third layer of the DICE and RIoT protocol is located in the network attached device and configured to receive data from the second layer and execute operations involving the data, wherein the data includes the public information and the public key.

7. The apparatus of claim 6, wherein the network attached device communication circuitry is further configured to perform an action in response to receiving a signature and a message from the communication circuitry of the network management device.

8. The apparatus of claim 7, wherein the signature and the message are received independent of the type of the network attached device.

9. The apparatus of claim 7, wherein the action comprises changing a state of the network attached device.

10. The apparatus of claim 9, wherein the state of the network attached device is changed to a different state than a state of a different network attached device.

11. The apparatus of claim 7, wherein the network attached device communication circuitry refrains from performing the action if an amount of time between a request of the signature and a response to the request exceeds a specified time.

12. The apparatus of claim 6, wherein the network attached device communication circuitry refrains from sharing a network attached device private key with another device outside the network attached device communication circuitry.

13. The apparatus of claim 6, wherein the network attached device communication circuitry refrains from sharing a network management device private key with another device outside the communication circuitry of the network management device.

14. A method comprising:

sending, using device identification composition engine and robust internet of things (DICE and RIoT) protocol and communication circuitry of a network management device, public information to communication circuitry of a network attached device;

coupling, using the DICE and RIoT protocol and the communication circuitry of the network management device, to the communication circuitry of the network attached device, wherein:

a first layer of the DICE and RIoT protocol is located in the communication circuitry of the network management device and is configured to provide a secret key to a second layer of the DICE and RIoT protocol;

the second layer of the DICE and RIoT protocol is located in the communication circuitry of the network management device and is configured to use the secret key to generate public information, private information, a first public key and a private key; and a third layer of the DICE and RIoT protocol is located in a network attached device and is configured to receive data from the second layer and execute operations involving the data, wherein the data includes the public information and a second public key;

receiving, using the DICE and RIoT protocol and the communication circuitry of the network management device, the second public key integrated into layers of the DICE and RIoT protocol and a random string value from the network attached device; and generating, using the DICE and RIoT protocol and the communication circuitry of the network management device, a message and a signature.

15. The method of claim 14, further comprising sending, using the DICE and RIoT protocol and the communication circuitry of the network management device, the message and the signature to the network attached device.

16. The method of claim 14, further comprising refraining from performing an action in the absence of verifying the signature.

17. The method of claim 14, further comprising refraining from performing further verification operations when the communication circuitry of the network attached device is unable to verify an identity of the network management device.

18. The method of claim 14, further comprising refraining from performing an action when the random string value was previously sent to the network attached device.

19. The method of claim 14, further comprising refraining from performing an action when a difference between a timestamp included in the random string value and a timestamp included in a previous random string value is greater than a threshold amount of time.

20. The method of claim 14, further comprising performing an action when a difference between a timestamp included in the random string value and a timestamp included in a previous random string is less than a threshold amount of time.

* * * * *